(12) United States Patent
Suzuki et al.

(10) Patent No.: US 11,985,282 B2
(45) Date of Patent: May 14, 2024

(54) IMAGE READING SYSTEM, IMAGE READING METHOD, AND NON-TRANSITORY COMPUTER-READABLE STORAGE MEDIUM STORING PROGRAM

(71) Applicant: SEIKO EPSON CORPORATION, Tokyo (JP)

(72) Inventors: Nobutaka Suzuki, Shiojiri (JP); Nao Sato, Matsumoto (JP); Osamu Koyama, Matsumoto (JP); Masatomo Kanamitsu, Kitakyushu (JP); Hideaki Tokuda, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/172,544

(22) Filed: Feb. 22, 2023

(65) Prior Publication Data
US 2023/0208995 A1    Jun. 29, 2023

(30) Foreign Application Priority Data
Feb. 25, 2022  (JP) ................. 2022-028220

(51) Int. Cl.
*H04N 1/00* (2006.01)
*G06V 30/146* (2022.01)
*G06V 30/416* (2022.01)

(52) U.S. Cl.
CPC ..... *H04N 1/00816* (2013.01); *G06V 30/1463* (2022.01); *G06V 30/416* (2022.01); *H04N 1/00806* (2013.01); *G06V 2201/131* (2022.01)

(58) Field of Classification Search
CPC ........... H04N 1/00816; H04N 1/00806; H04N 1/00331; G06V 30/1463; G06V 30/416; G06V 2201/131; G06T 7/11; G06T 5/002; G06T 7/136; G06T 2207/20081; G06T 2207/20084; G06T 7/13; G06T 2207/10024; G06T 7/187; G06T 7/62; G06T 7/194; G06T 2207/10004; G06T 2207/20032; G06T 5/30; G06T 7/90; G06T 11/001; G06T 5/40; G06T 7/0012; G06T 7/73; G06T 7/80; G06T 11/003; G06T 11/40; G06T 15/10; G06T 15/205; G06T 17/00; G06T 2207/10028; G06T 2207/10048; G06T 2207/10081;
(Continued)

(56) References Cited

U.S. PATENT DOCUMENTS 5,991,516 A * 11/1999 Desmond ................ G06F 3/126
                                                    358/1.15
6,583,799 B1 * 6/2003 Manolis .................. G06F 16/50
                                                     715/838
(Continued)

FOREIGN PATENT DOCUMENTS

JP    2011-066510 A    3/2011

*Primary Examiner* — Negussie Worku
(74) *Attorney, Agent, or Firm* — WORKMAN NYDEGGER

(57) ABSTRACT

Provided is an image reading system that divides, with respect to image data obtained by performing a double sided reading in a state where a booklet is opened, cover sheet image data into two parts corresponding to a pair of cover sheets to arrange the two parts at a front and an end, respectively, and arranges main text image data between the front and the end, and then generates an image file from each of the arranged image data.

12 Claims, 15 Drawing Sheets

(58) Field of Classification Search
CPC . G06T 2207/20036; G06T 2207/20092; G06T 2207/30036; G06T 2207/30132; G06T 2207/30188; G06T 3/4007; G06T 5/001; G06T 5/006; G06T 5/50; G06T 7/0004; G06T 7/60; G06T 1/20; G06T 1/60; G06T 11/60; G06T 17/05; G06T 19/003; G06T 2207/10016; G06T 2207/10036; G06T 2207/10044; G06T 2207/10061; G06T 2207/10116; G06T 2207/20024; G06T 2207/20028; G06T 2207/20064; G06T 2207/20128; G06T 2207/20132; G06T 2207/20172; G06T 2207/20221; G06T 2207/20224; G06T 2207/30004; G06T 2207/30056; G06T 2207/30108; G06T 2207/30141; G06T 2207/30148; G06T 2207/30196; G06T 2207/30201; G06T 2207/30242; G06T 2207/30256; G06T 3/0062; G06T 3/0075; G06T 3/4038; G06T 3/4053; G06T 3/60; G06T 5/003; G06T 5/005
USPC .......................................................... 358/453
See application file for complete search history.

(56) References Cited

U.S. PATENT DOCUMENTS

| | | | | |
|---|---|---|---|---|
| 6,825,949 | B1* | 11/2004 | Hirai | G03G 15/5095 |
| | | | | 283/64 |
| 10,218,877 | B2* | 2/2019 | Matsumae | H04N 1/233 |
| 11,343,406 | B2* | 5/2022 | Masuda | H04N 1/3873 |
| 11,622,051 | B2* | 4/2023 | Hamashima | H04N 1/00469 |
| | | | | 358/3.24 |
| 2007/0170632 | A1* | 7/2007 | Isamikawa | B42C 11/02 |
| | | | | 270/52.02 |
| 2007/0279646 | A1* | 12/2007 | Sugimoto | G03G 15/6538 |
| | | | | 358/1.1 |
| 2010/0091311 | A1* | 4/2010 | Sato | B65H 37/04 |
| | | | | 358/1.12 |
| 2012/0070250 | A1* | 3/2012 | Ando | B26F 1/12 |
| | | | | 412/6 |
| 2015/0063951 | A1* | 3/2015 | Kurohata | G03G 15/6544 |
| | | | | 412/1 |
| 2016/0313687 | A1* | 10/2016 | Osada | B42C 3/00 |
| 2020/0242347 | A1* | 7/2020 | Harada | G06V 30/413 |
| 2023/0145962 | A1* | 5/2023 | Fujisaki | H04N 1/00713 |
| | | | | 358/1.12 |
| 2023/0148171 | A1* | 5/2023 | Taniyama | H04N 1/00806 |
| | | | | 358/1.13 |

* cited by examiner

IMAGE READING SYSTEM, IMAGE READING METHOD, AND NON-TRANSITORY COMPUTER-READABLE STORAGE MEDIUM STORING PROGRAM

The present application is based on, and claims priority from JP Application Serial Number 2022-028220, filed Feb. 25, 2022, the disclosure of which is hereby incorporated by reference herein in its entirety.

BACKGROUND

1. Technical Field

The present disclosure relates to an image reading system, an image reading method, and a non-transitory computer-readable storage medium storing a program including an image reading apparatus that reads an image from a booklet.

2. Related Art

For example, JP-A-2011-66510 discloses an image reading apparatus capable of acquiring image data for each page in page order by reading a document printed by bookbinding with a reading section. This image reading apparatus uses a paper, which is printed such that a booklet of manuscript data can be created by folding the paper in half and binding, as a document. This image reading apparatus includes a division section that divides the image data, which is read by the reading section, into two parts and a display section that displays two-page image data, which is divided from the image data read first from the document, and two-page image data, which is divided from the image data read last from the document. Further, the image reading apparatus includes a reception section that receives, from an operator, a selection of the image data to be a first page of manuscript data from image data displayed by the display section and a rearrangement section that rearranges the image data divided by the division section in the same order as a page order of the manuscript data, based on the image data that is the first page of the manuscript data received by the reception section.

However, the image reading apparatus described in JP-A-2011-66510 is an apparatus that reads a document printed by bookbinding before performing the bookbinding with the reading section. Therefore, when a user wants to read an image from a booklet that is already in a bounding state, the user needs to remove staples of Hotchkiss (registered trademark) (stapler) from a binding place of the booklet or cut the booklet 15 to separate the booklet into a plurality of documents. However, the work of separating the booklet, such as removing staples of Hotchkiss, is troublesome, and when it is desired to return to the original booklet after reading, it is necessary to bind a plurality of documents in a bounding state. Therefore, there is a demand for obtaining image data in the same page order as a booklet by having the image reading apparatus read the booklet without separating the booklet.

SUMMARY

According to an aspect of the present disclosure, there is provided an image reading system that includes an image reading apparatus, which is configured to perform a double sided reading by a reading portion including a first reading portion configured to read a first side of a document and a second reading portion configured to read a second side that is a side opposite to the first side of the document, and a reading control apparatus communicably connected to the image reading apparatus, the image reading system includes: a storage portion storing, when the image reading apparatus performs the double sided reading in a state in which a booklet having a pair of cover sheets and a main text interposed between the pair of cover sheets is opened at least one time, image data of the booklet read by the reading portion; a cover sheet determination portion determining whether the image data, which is stored in the storage portion, is cover sheet image data obtained by reading the cover sheet; a main text determination portion determining image data of a back side of the cover sheet, which is a reading source of the cover sheet image data determined by the cover sheet determination portion among the image data stored in the storage portion, as main text image data; an arrangement processing portion rearranging the cover sheet image data and the main text image data at page order arrangement positions of the booklet; and a file generation portion generating an image file from the cover sheet image data and the main text image data rearranged by the arrangement processing portion, in which the arrangement processing portion divides the cover sheet image data into two parts corresponding to the pair of cover sheets to arrange the two parts at a front and an end, respectively, and arranges the main text image data between the front and the end.

According to another aspect of the present disclosure, there is provided an image reading apparatus that is configured to perform a double sided reading by a reading portion including a first reading portion configured to read a first side of a document and a second reading portion configured to read a second side that is a side opposite to the first side of the document, the image reading apparatus includes: when the double sided reading is performed in a state in which a booklet having a pair of cover sheets and a main text interposed between the pair of cover sheets is opened at least one time, a storage portion storing image data of the booklet read by the reading portion; a cover sheet determination portion determining whether the image data, which is stored in the storage portion, is cover sheet image data obtained by reading the cover sheet; a main text determination portion determining image data of a back side of the cover sheet, which is a reading source of the cover sheet image data determined by the cover sheet determination portion among the image data stored in the storage portion, as main text image data; an arrangement processing portion rearranging the cover sheet image data and the main text image data at page order arrangement positions of the booklet; and a file generation portion generating an image file from the cover sheet image data and the main text image data rearranged by the arrangement processing portion, in which the arrangement processing portion divides the cover sheet image data into two parts corresponding to the pair of cover sheets to arrange the two parts at a front and an end, respectively, and arranges the main text image data between the front and the end.

According to still another aspect of the present disclosure, there is provided an image reading method of generating a file of a booklet from image data acquired by causing an image reading apparatus, which is configured to perform a double sided reading by a reading portion including a first reading portion configured to read a first side of a document and a second reading portion configured to read a second side that is a side opposite to the first side of the document, to read the booklet, the image reading method includes: when the image reading apparatus performs the double sided reading in a state in which a booklet having a pair of cover sheets and a main text interposed between the pair of cover sheets is opened at least one time, (a) storing, by a computer, image data of the booklet read by the reading portion in the storage portion; (b) determining, by the computer, whether the image data, which is stored in the storage portion, is cover sheet image data obtained by reading the cover sheet; (c) determining, by the computer, image data of a back side of the cover sheet, which is a reading source of the cover sheet image data determined in (b) among the image data stored in the storage portion, as main text image data; (d) rearranging, by the computer, the cover sheet image data and the main text image data at page order arrangement positions of the booklet; and (e) generating, by the computer, an image file from the cover sheet image data and the main text image data which are rearranged, in which in (d), the cover sheet image data is divided into two parts corresponding to the pair of cover sheets, the two parts are arranged at a front and an end, respectively, and the main text image data is arranged between the front and the end.

According to still another aspect of the present disclosure, there is provided a non-transitory computer-readable storage medium storing a program executed by a computer to perform processing of generating a file of a booklet from image data acquired by causing an image reading apparatus, which is configured to perform a double sided reading by a reading portion including a first reading portion configured to read a first side of a document and a second reading portion configured to read a second side that is a side opposite to the first side of the document, to read the booklet, the program causing the computer to: when the image reading apparatus performs the double sided reading in a state in which a booklet having a pair of cover sheets and a main text interposed between the pair of cover sheets is opened at least one time, (a) store image data of the booklet read by the reading portion in the storage portion; (b) determine whether the image data, which is stored in the storage portion, is cover sheet image data obtained by reading the cover sheet; (c) determine image data of a back side of the cover sheet, which is a reading source of the cover sheet image data determined in (b) among the image data stored in the storage portion, as main text image data; (d) rearrange the cover sheet image data and the main text image data at page order arrangement positions of the booklet; and (e) generate a file from the cover sheet image data and the main text image data which are rearranged, in which in (d), the cover sheet image data is divided into two parts corresponding to the pair of cover sheets, the two parts are arranged at a front and an end, respectively, and the main text image data is arranged between the front and the end.

DESCRIPTION OF EXEMPLARY EMBODIMENTS

First Embodiment

Figure 1:
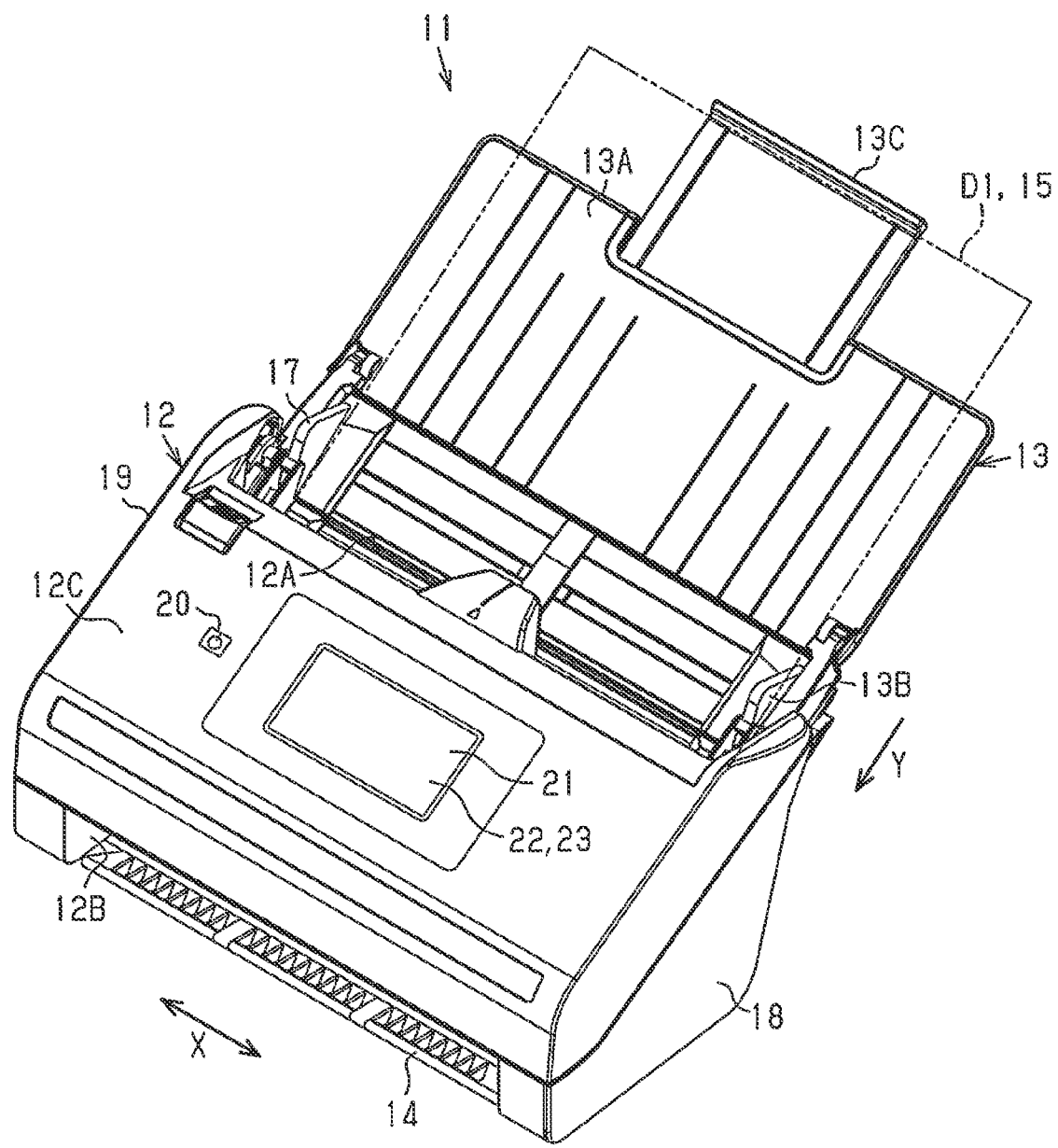
FIG. 1 is a perspective view illustrating an image reading apparatus according to a first embodiment.

Hereinafter, a first embodiment of an image reading system 10 will be described with reference to the drawings. The image reading system 10 includes an image reading apparatus 11 illustrated in FIG. 1 and a reading control apparatus 110 (see FIG. 5) communicably connected to the image reading apparatus 11. The reading control apparatus 110 is provided as an apparatus configured with software in a host apparatus 100 (see FIG. 5) communicably connected to the image reading apparatus 11. The host apparatus 100 is used by a user to give an instruction when operating the image reading apparatus 11 to read an image such as a document Dl, which is a reading target. The host apparatus 100 is a personal computer (PC), a mobile information terminal (personal digital assistants (PDA)), a smart device such as a tablet PC or a smartphone, and the like.

Configuration of Image Reading Apparatus 11

The configuration of the image reading apparatus 11 of the present embodiment will be described with reference to FIG. 1. The image reading apparatus 11 assumes a document D1 and a booklet 15 (see FIG. 3) as reading targets. Hereinafter, although the configuration of the image reading apparatus 11 is described using the document D1 as an example of the reading target, the reading target is not limited to the document D1, and the booklet 15 may be used.

As illustrated in FIG. 1, the image reading apparatus 11 includes a main body 12 having a substantially trapezoidal shape in a side view and a document support 13 on which the document D1, which is an image reading target, is placed (set). A stacker 14 is accommodated in the main body 12 at a lower side of an ejection port 12B at a state capable of sliding in a front/rear direction.

The document support 13 has a flat-shaped placement surface 13A on which a plurality of documents D1 can be placed by being extended obliquely upward on a rear side of the main body 12. The document support 13 is provided with a pair of edge guides 13B that are capable of sliding in the width direction X intersecting (particularly orthogonal to) the transporting direction Y in which the document D1 is transported. The document D1, which is placed on the placement surface 13A is positioned in the width direction X with respect to a feeding port 12A by being interposed between the pair of edge guides 13B. The document support 13 is provided with a document positioning mechanism 17 including a slide mechanism that interlocks the pair of edge guides 13B and makes the pair of edge guides 13B slide in the width direction X. A slide type auxiliary support portion 13C is provided on the placement surface 13A of the document support 13 to be capable of moving in and out. The document D1, which is placed on the placement surface 13A, is positioned in the transporting direction Y with respect to the feeding port 12A by being in contact with the slide type auxiliary support portion 13C. The width direction X is a main scanning direction when the image reading apparatus 11 reads an image of the document D1, and the transporting direction Y is a sub-scanning direction.

The document D1, which is placed on the document support 13, is fed one by one into the main body 12 from the feeding port 12A that is opened at an upper portion of the main body 12. The fed document D1 is transported in the main body 12 along a predetermined transport path 29 (see FIG. 2) and is ejected from the ejection port 12B that is opened at a lower portion of the front side of the main body 12 after an image is read in a reading area SA during the transport.

A power button 20 is provided on a front surface portion 12C of the main body 12. The front surface portion 12C of the main body 12 is provided with a display portion 22 such as a liquid crystal panel for displaying a predetermined image in a display area 23. The display portion 22 is configured to display information related to the image reading apparatus 11. The display portion 22 is provided with an input portion 21 such as a touch panel that is capable of detecting a user's touch operation. The input portion 21 is configured to be capable of inputting necessary information according to a user's touch operation when an instruction is given to the image reading apparatus 11.

Figure 2:
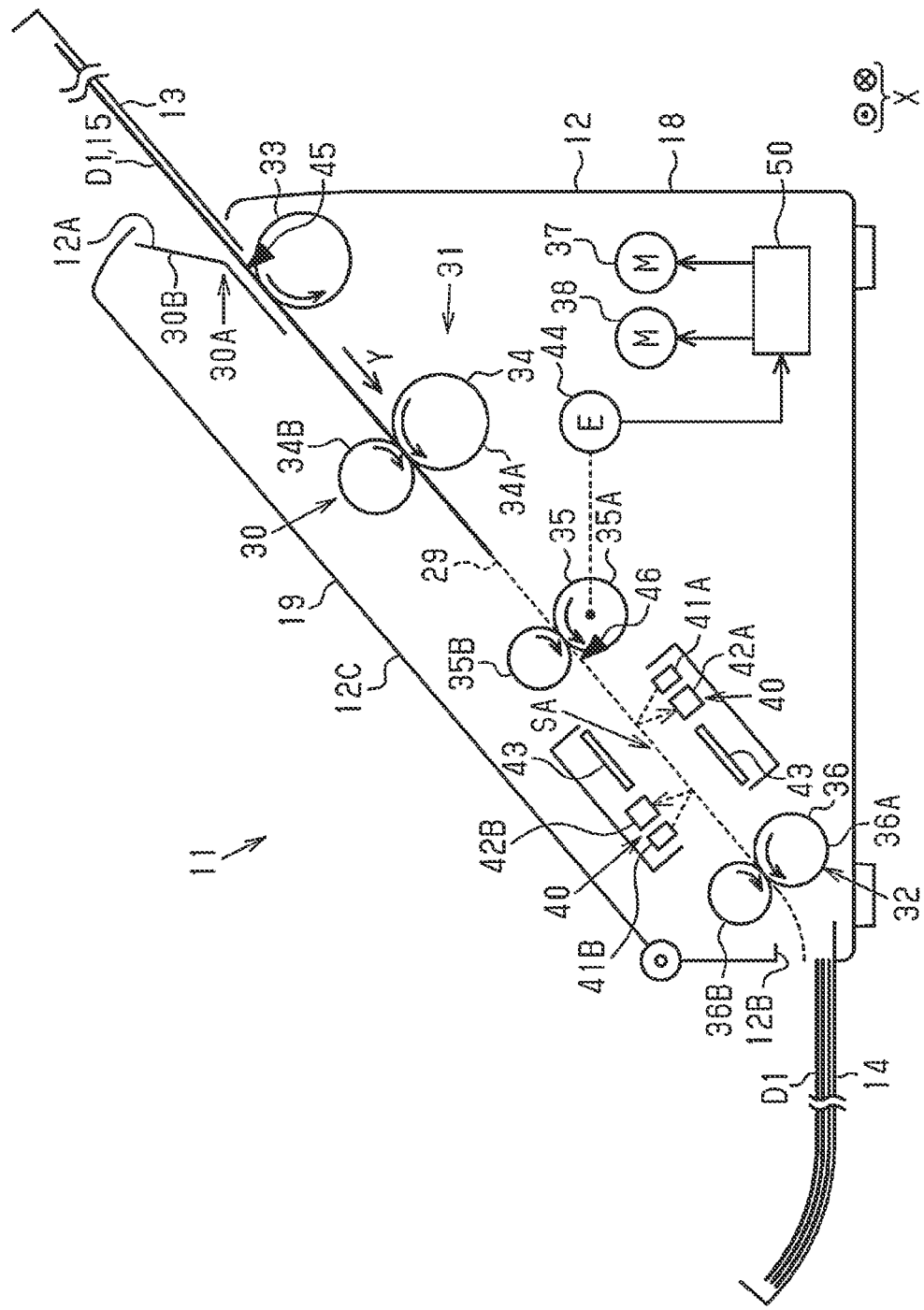
FIG. 2 is a schematic side sectional view illustrating the image reading apparatus.

As illustrated in FIG. 2, the main body 12 includes a main body portion 18 and a cover portion 19 that is rotatably coupled to a front end portion of the main body portion 18 as a center. The main body 12 includes a transport path 29 (a transport passage) extending from the feeding port 12A to the ejection port 12B between the main body portion 18 and the cover portion 19.

A transport mechanism 30 that transports the document D1 is provided in the main body 12. The transport mechanism 30 includes a feeding portion 30A that guides and feeds the documents D1, which is placed (set) on the document support 13, one by one into the main body 12, a transport portion 31 that transports the fed document D1 along the transport path 29 such that the document D1 passes through the reading area SA, and an ejection portion 32 that ejects the document D1 in which an image has been read while being transported by the transport portion 31. The transport mechanism 30 has an automatic document feed function of sequentially transporting a plurality of documents D1, which are placed on the document support 13, one by one along the transport path 29 such that the plurality of documents D1 pass through the reading area SA.

The feeding portion 30A includes one feeding roller 33 (a pickup roller) facing a feeding guide 30B at an upstream end position of the transport path 29 in the main body 12. The feeding portion 30A feeds the plurality of documents D1, which are placed on the document support 13, one by one from the feeding port 12A along the feeding guide 30B.

As illustrated in FIG. 2, the transport portion 31 includes a pair of feeding rollers 34 disposed at positions downstream of the feeding roller 33 in the transporting direction Y and a pair of transporting rollers 35 disposed at positions upstream of the reading area SA in the transport direction Y. The pair of feeding rollers 34 is composed of a driving roller 34A and a separation roller 34B (a retard roller). The pair of transporting rollers 35 is composed of a driving roller 35A and a driven roller 35B.

The ejection portion 32 includes a pair of ejection rollers 36 disposed at positions downstream of the reading area SA in the transporting direction Y. The pair of ejection rollers 36 is composed of a driving roller 36A and a driven roller 36B. The pair of ejection rollers 36, is also responsible for transporting the document D1 during reading, together with the pair of transporting rollers 35.

As described above, the feeding roller 33, the pair of feeding rollers 34, the pair of transporting rollers 35, and the pair of ejection rollers 36 are disposed in this order from the upstream in the transporting direction Y, and are disposed in a plurality of sets at intervals in the width direction X, respectively.

The plurality of feeding-based rollers 33 and 34A are rotationally driven by the power of a feeding motor 37, which is a power source for these rollers. The plurality of documents D1 placed on the document support 13 are fed into the main body 12 from the feeding port 12A one by one in order from the lowest one by the feeding roller 33.

The feeding-based separation roller 34B and the transporting-based driving rollers 35A and 36A are rotationally driven by the power of the transporting motor 38, which is a power source of these rollers. The document D1, which is fed into the main body 12 by the feeding roller 33, is transported to the reading area SA and then ejected from the ejection port 12B.

The driving rollers 35A and 36A are rotationally driven to transport the document D1 at the same transporting speed (the reading speed) when the document D1 is read. Each of the driven rollers 35B and 36B is associatively rotated by the rotation of the driving rollers 35A and 36A paired with each other.

Inside the main body 12, an encoder 44 (for example, a rotary encoder) capable of detecting the rotation of one transporting-based driving roller among a plurality of pairs of rollers 34 to 36 is provided. The encoder 44 outputs a detection signal, which includes a number of pulses proportional to the rotation amount of the driving roller, to the control portion 50 (controller). Therefore, the control portion 50 can grasp a transporting position, which is a position of the document D1 being transported, and a transporting speed based on the detection signal of the encoder 44.

A document sensor 45 that detects a presence or absence of the document D1, which is set on the document support 13, is disposed at a position between the pair of feeding rollers 33 in the width direction X. The document sensor 45 is, for example, a contact type sensor having a lever and is turned on when a front end portion of the document D1 presses the lever in a case where the document D1 is set on the document support 13.

A document presence-absence sensor 46, which is capable of detecting the presence or absence of the document D1, is disposed at a position slightly downstream of a nip position of the pair of transporting rollers 35 in the transporting direction Y. The document presence-absence sensor 46 is, for example, a contact type sensor having a lever (a contactor). The document presence-absence sensor 46 detects the document D1 when the front end of the document D1 presses the lever and is turned on, and when the rear end of the document D1 passes by and the lever is no longer pressed, the document presence-absence sensor 46 stops detecting the document D1 and is turned off.

Therefore, the control portion 50 detects that the front end of the document D1 has passed the pair of transporting rollers 35 and that the rear end of the document D1 has passed the pair of transporting rollers 35, based on the detection signal (ON/OFF) of the document presence-absence sensor 46. A detection result obtained by detecting the front end and the rear end of the document D1 by the document presence-absence sensor 46 is used for control of determining the start and end timings of a reading operation of the reading portion 40, which will be described later. The document presence-absence sensor 46 is also used to detect the length of the document D1 in the transporting direction Y, that is, the size of the document determined by the length, based on a transport distance of the document D1 from the detection of the front end of the document D1 to the detection of the rear end of the document D1. The document presence-absence sensor 46 may be a non-contact sensor such as an optical type sensor.

As illustrated in FIG. 2, the image reading apparatus 11 includes the reading portion 40, which is capable of performing a double sided reading on a reading target (the document D1 or the booklet 15). The reading portion 40 reads the reading target in the reading area SA on the transport path 29. The reading portion 40 includes a first reading portion 42A capable of reading a first side, which is a reading target, and a second reading portion 42B capable of reading a second side that is a side opposite to the first side, which is a reading target. The first side is a front side, which is a reading target, and is a lower side in the example illustrated in FIG. 2. The second side is a back side, which is a reading target, and is an upper side in the example illustrated in FIG. 2. That is, the pair of reading portions 42A and 42B are provided on both sides with the transport path 29 interposed therebetween at a position between the pair of transporting rollers 35 and the pair of ejection rollers 36 in the transporting direction Y. The positions of the first reading portion 42A and the second reading portion 42B may be shifted from each other in the transporting direction Y or may be at positions facing each other with the transport path 29 interposed therebetween. In short, the first reading portion 42A and the second reading portion 42B may be disposed at positions where both sides of the reading target can be read.

The reading portion 40 includes a pair of light sources 41A and 41B that is capable of irradiating both sides of the reading target with light in the reading area SA. The first light source 41A irradiates the reading area of the first reading portion 42A of the first side of the document D1 with light. The second light source 41B irradiates the reading area of the second reading portion 42B of the second side of the document D1 being transported with light. The first reading portion 42A reads the first side of the document D1 in an area irradiated with the light from the first light source 41A. The second reading portion 42B reads the second side of the document D1 in an area irradiated with the light from the second light source 41B.

The pair of light sources 41A and 41B are composed of, for example, an LED, a fluorescent lamp, or the like. The pair of reading portions 42A and 42B receive reflected light, which is reflected by the document D1 from the light emitted from the light sources 41A and 41B, convert the received light into an electric signal, and output a pixel signal having a value corresponding to the amount of received light. The pair of reading portions 42A and 42B are image sensors that read an image. The image sensor is, for example, a linear image sensor. The image reading apparatus 11 is capable of performing a color scan and a monochrome scan (a gray scale scan). The image sensor performs photoelectric conversion of the light received by each photoelectric conversion element and outputs a pixel signal having a value corresponding to the amount of received light.

The image sensor is, for example, a contact type image sensor in which a plurality of photoelectric conversion elements are arranged in a row along the main scanning direction X. The image sensor may be a complementary metal oxide semiconductor (CMOS) image sensor. Further, the image sensor may be a charge coupled device (CCD) image sensor.

Further, in the main body 12, color reference plates 43 are disposed facing the pair of reading portions 42A and 42B, with the transport path 29 interposed therebetween. The color reference plates 43 are read by the pair of reading portions 42A and 42B when there is no document D1, which is a reading target, at positions facing the pair of reading portions 42A and 42B. That is, the color reference plate 43 is a background plate that is read as a background of the document D1. The color reference plate 43 is a member for obtaining a white reference value for shading correction, and a white reference plate exhibiting white or a gray reference plate exhibiting gray (gray) is used. As a result, the color reference plate 43 is read as a white reference image, and a white reference value is generated based on the read white reference image. The color reference plate 43, when it is a gray reference plate, is used when detecting a position and an area of the document D1 from an area including the gray background by reading the color reference plate 43 as the background (the gray background) of the document D1. When the color reference plate 43 is a reference member for obtaining a white reference value that is a reference for brightness, the shape and color can be appropriately selected.

As illustrated in FIG. 2, the image reading apparatus 11 includes the control portion 50. The control portion 50 controls the image reading apparatus 11 when a job for reading an image from the document D1 is input based on an operation signal from the input portion 21 (see FIG. 1), which is operated by a user, or a reading instruction signal (a reading instruction) from a host apparatus 100 described later. When the control portion 50 performs reading control, the control portion 50 controls the feeding motor 37, the transporting motor 38, and the reading portion 40, and processes the image data based on the image read from the document D1 by the reading portion 40.

In the normal mode, there is a single sided reading mode in which only the first reading portion 42A performs a reading operation to read the front side of the document D1 and a double sided reading mode in which both the first reading portion 42A and the second reading portion 42B perform reading operations to read both sides of the document D1. The image reading apparatus 11 of the present embodiment further includes a booklet generation mode for reading the booklet 15. In the booklet generation mode, a first side (for example, a lower side) and a second side (for example, an upper side) are read with both sides of the booklet 15 as reading sides. The image reading system 10 has a function of rearranging the images of the booklet 15, which is read by the image reading apparatus 11 in the booklet generation mode, in page order.

Description of Booklet 15

Figure 3:
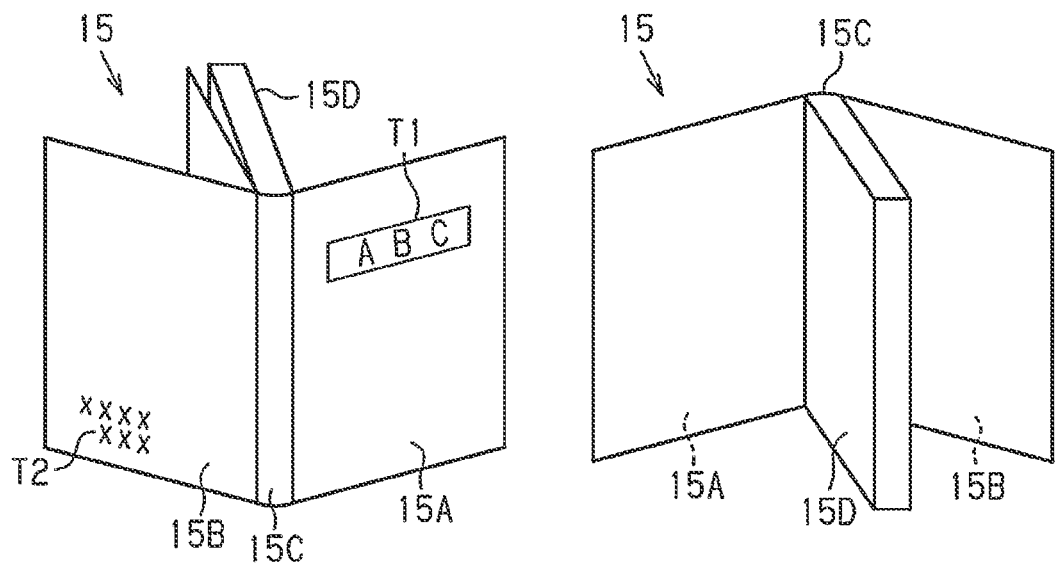
FIG. 3 is a perspective view of a booklet as viewed from different directions.

Next, the booklet 15, which is one of the reading targets of the image reading apparatus 11, will be described with reference to FIG. 3. As illustrated in FIG. 3, the booklet 15 has a pair of cover sheets 15A and 15B and a main text 15D interposed between the pair of cover sheets 15A and 15B. Specifically, the pair of cover sheets 15A and 15B are a cover sheet 15A and a back cover sheet 15B. That is, the booklet 15 is composed of the cover sheet 15A, the back cover sheet 15B, a spine cover sheet 15C, and the main text 15D. The booklet 15 is a booklet 15 in which print materials are bound, and examples thereof include a passport, a book, a pamphlet, and the like.

Normally, a title T1 such as a name of the booklet 15 or a name indicating the content of the main text 15D is printed on the front side of the cover sheet 15A. The title T1 normally includes characters (text). On the front side of the back cover sheet 15B of the booklet 15, although booklet attribute information T2 such as a publisher, an issuer, date of issue, and a price are printed, the booklet attribute information T2 may not be printed. The booklet attribute information T2 includes characters (text). The back side of the cover sheet 15A and the back side of the back cover sheet 15B may be a part of the main text or may be a blank sheet.

Method of Setting Booklet 15

Next, a method of setting the booklet 15 on the document support 13 for the image reading apparatus 11 to read the booklet 15 will be described with reference to FIG. 4.

Figure 4:
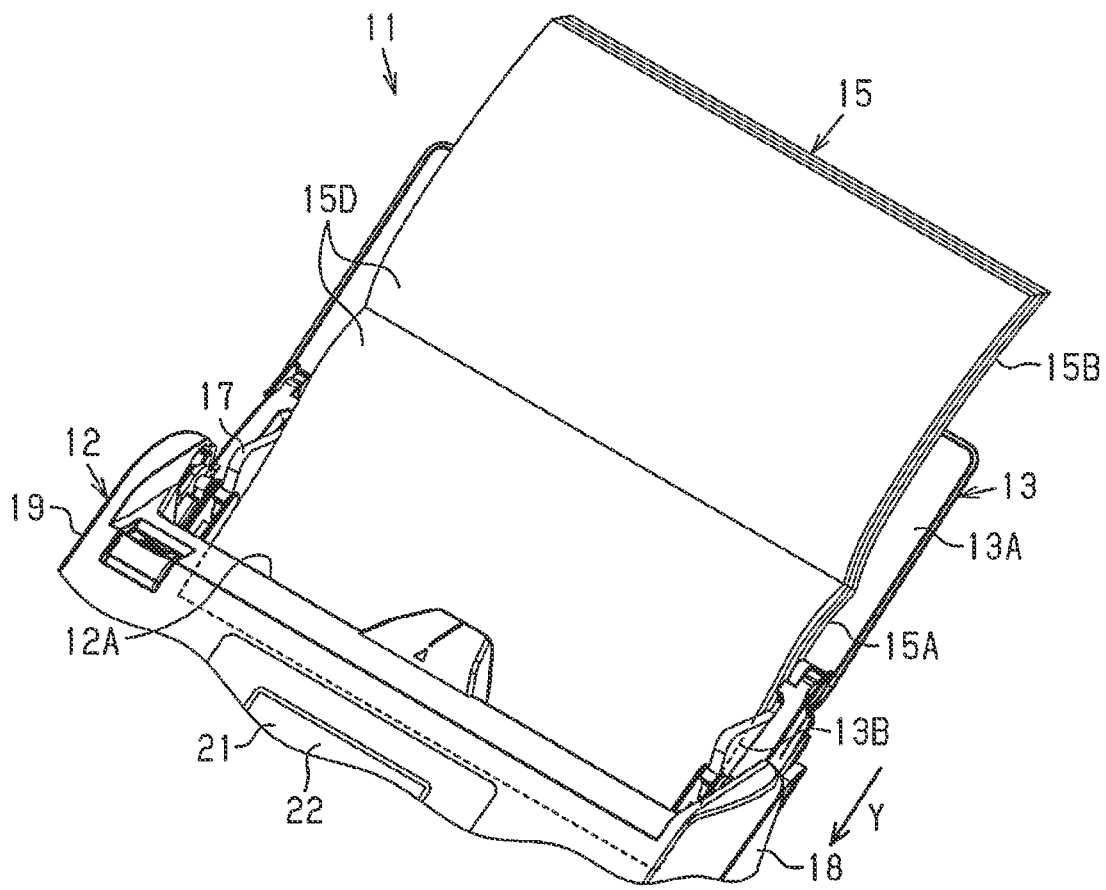
FIG. 4 is a partial perspective view illustrating a state in which the booklet is set in the image reading apparatus.

As illustrated in FIG. 4, when the booklet 15 is read by the image reading apparatus 11, the booklet 15 is opened, and for example, the booklet 15 is set (placed) on the document support 13 in an orientation in which a page of the main text is positioned on the upper side. The booklet 15 is set on the document support 13 in a state in which the first two pages, which are reading targets, are opened in a double-page spread manner in the first scan. It is assumed that the first two pages of the main text 15D to be read are defined as a first page and a second page. Therefore, even when reading the booklet 15 is started from, for example, the 11th page, the 11th and 12th pages to be read first become the first and second pages, which are reading targets.

By the first scan, the booklet 15 is ejected from the ejection port 12B (see FIGS. 1 and 2). The user turns pages of the booklet 15, sets pages to be read next in a double-page spread state, and sets the booklet 15 on the document support 13 in an orientation in which the double-spread pages are positioned on the upper side. When the second scan is performed, the booklet 15 is set on the document support 13 in the orientation in which a reading start side is the same side when the first scan is performed. Hereinafter, similarly, the user turns the pages of the booklet 15 each time one scan is ended. By transporting the booklet 15 in the orientation in which the double-spread two pages are positioned on the upper side and in a direction in which the same side of the booklet 15 is at the front, the desired pages are sequentially read by double-spread two pages.

When the booklet 15 is set and read in this way, by using the lower side of the booklet 15 as the first reading side, the first reading portion 42A reads two pages of the cover sheet 15A and the back cover sheet 15B. At the same time, the second reading portion 42B reads the double-spread two pages of the main text 15D by using the upper side of the booklet 15 as the second reading side. The back side of the cover sheet 15A and the back side of the back cover sheet 15B may be regarded as a part of the main text 15D.

When the booklet 15 is set in the predetermined above-mentioned orientation and the booklet 15 is read by the image reading apparatus 11, the cover sheet 15A and the back cover sheet 15B are always read by the first reading portion 42A as the first reading side at each scan including the first scan and the second scan. Since the double-spread pages of the booklet 15 are changed every time each scan is performed, the read images of the double-spread two pages, which are read as the second reading side by the second reading portion 42B, are changed every time.

Electrical Configuration

Next, an electrical configuration of the image reading system 10 including the image reading apparatus 11 will be described with reference to FIG. 5.

Figure 5:
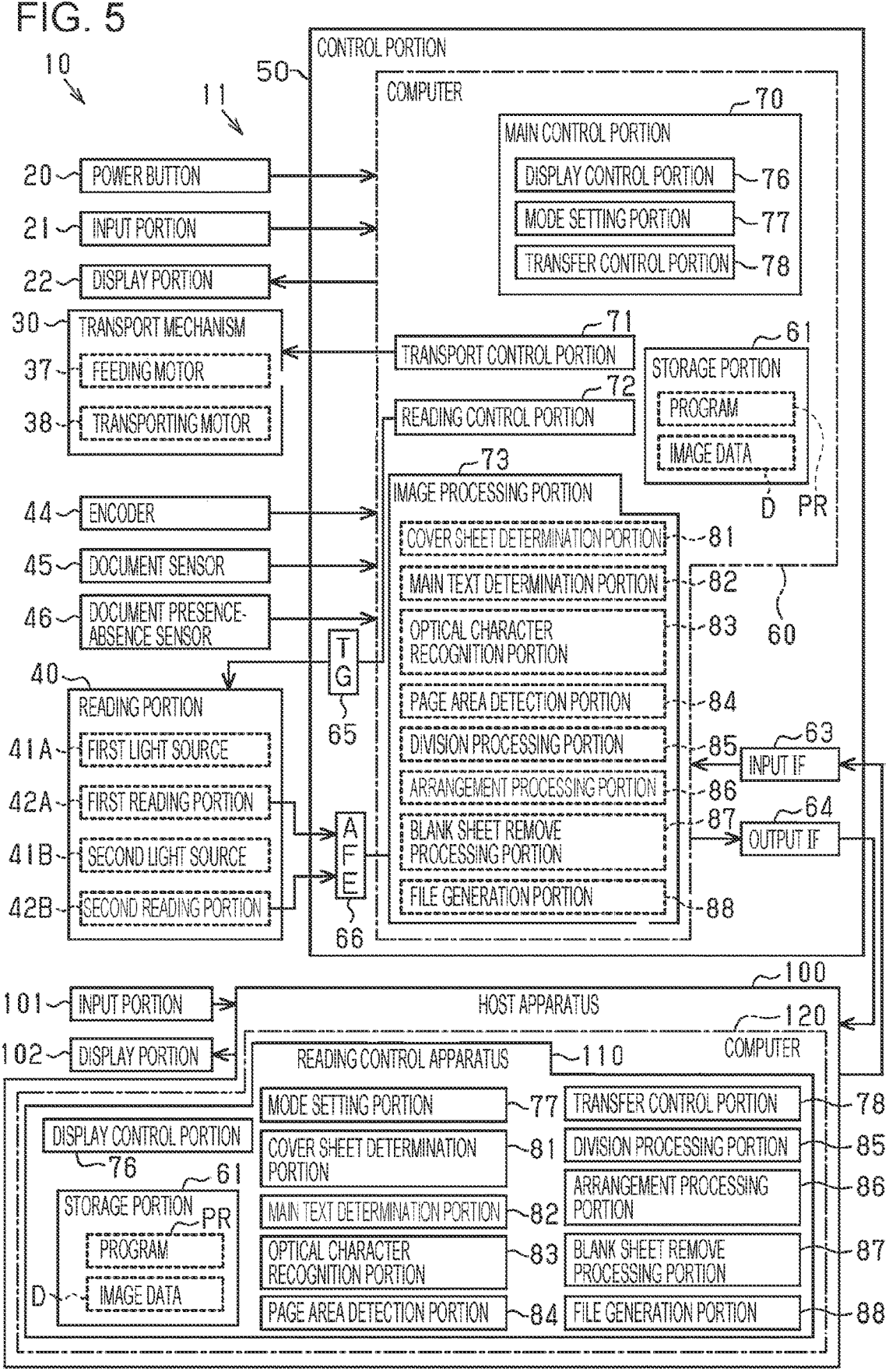
FIG. 5 is a block diagram illustrating an electrical configuration of the image reading apparatus.

As illustrated in FIG. 5, the image reading system 10 includes the image reading apparatus 11, which reads the document D1, and a reading control apparatus 110, which controls the image reading apparatus 11. The image reading system 10 has a page rearranging function of rearranging a plurality of pages from images of the booklet 15, which are read by the image reading apparatus 11, in an appropriate page order. The reading control apparatus 110 is built in the host apparatus 100 communicably connected to the image reading apparatus 11. A program, which includes a scan driver program, is installed in a computer 120 in the host apparatus 100. The reading control apparatus 110 includes software configured with a computer 120 that executes this program. The reading control apparatus 110 may be a scan driver or may be support software for the image reading apparatus 11. The reading control apparatus 110 causes a display portion 102 to display various screens according to an instruction from an input portion 101 of the host apparatus 100, or causes the image reading apparatus 11 to execute a scan under a predetermined scanning condition. The details of the function of the image reading system 10 for rearranging the images, which are read from the booklet 15, in page order will be described later.

First, the electrical configuration of the image reading apparatus 11 will be described. The image reading apparatus 11 is connected to the host apparatus 100 through a communication cable. The host apparatus 100 is, for example, a personal computer (hereinafter, also referred to as a "PC") and includes the input portion 101 and the display portion 102 that are electrically coupled to the main body of the host apparatus 100. The host apparatus 100 includes a reading driver including software having a function of performing a reading instruction with respect to the image reading apparatus 11 by installing a program for a reading driver.

When the input portion 21 or the input portion 101 of the host apparatus 100 is operated by the user, a setting condition related to an image reading process is set. That is, the setting condition is set by an input of the user. The setting conditions include reading conditions including a document size, a reading resolution, reading color, single sided reading/double sided reading, and the like, and a saving condition including a saving format of the reading data (the image data), a transfer method, and a saving destination. The document size includes, for example, A4 size, B5 size, and the like, the reading resolution includes, for example, 300 dpi/600 dpi, and the reading color includes a monochrome (a gray scale)/color.

The booklet generation mode is selected by using a touch operation by the input portion 21 or a pointing device such as a mouse that constitutes the input portion 101, and a setting process such as designation of the saving format used for saving a file and the transfer method used for transferring the file and designation of the saving destination, is performed. The saving format includes a PDF format, a PDF/A format, a JPEG format, a GIF format, a TIFF format, and the like. The transfer method includes transferring to the host apparatus 100, transferring emails, and the like, and an address of the saving destination or the like is designated as a saving destination.

Figure 13:
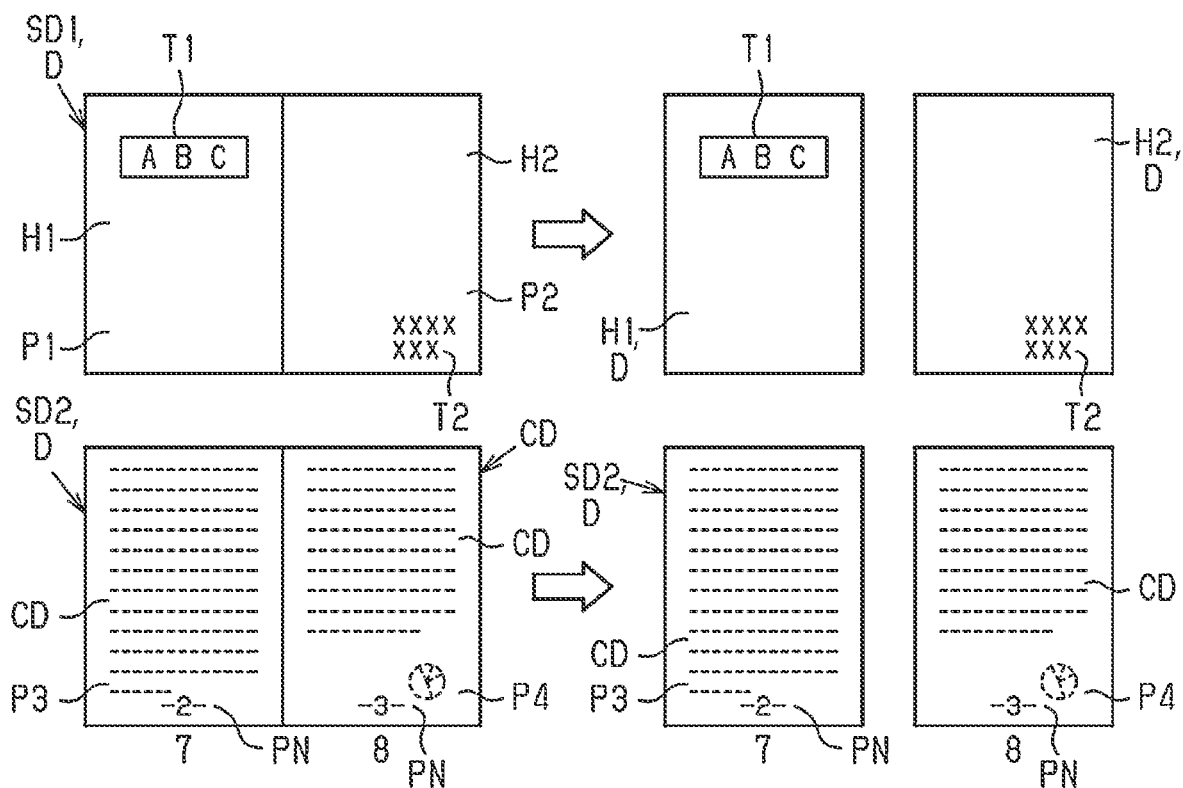
FIG. 13 is a schematic diagram illustrating a separation process of a cover sheet and a back cover sheet and a separation process of a main text.

The image reading apparatus 11 includes the control portion 50 that collectively controls the image reading apparatus 11. The control portion 50 includes a computer 60 including a microprocessor or the like. The computer 60 includes a storage portion 61. Various programs including a program PR shown in the flowchart illustrated in FIG. 13 are stored in the storage portion 61. The storage portion 61 temporarily stores (saves) image data D, which is a reading target, acquired by being read by the reading portion 40. When the reading target is the booklet 15, the image reading apparatus 11 performs a double sided reading on the booklet 15 in a state in which the booklet 15 is opened at least once. In this case, the storage portion 61 stores the image data D of the booklet 15 acquired by being read by the reading portion 40.

The control portion 50 includes an input interface 63 (hereinafter also referred to as an "input IF 63") for inputting various data or signals from the host apparatus 100 and an output interface 64 (hereinafter also referred to as an "output IF 64") for outputting read data, which is read by the image reading apparatus 11, to the host apparatus 100.

The control portion 50 includes a timing generator 65 (hereinafter, also referred to as a "TG 65") that outputs a pulse signal that defines various operation timings including a read operation with respect to the reading portions 42A and 42B. The control portion 50 includes an analog front end 66 (hereinafter, also referred to as an "AFE 66") that performs analog/digital conversion (A/D conversion) of pixel signals input from the reading portions 42A and 42B.

The computer 60 includes a main control portion 70, a transport control portion 71, a reading control portion 72, and an image processing portion 73 as functional parts including software configured internally by executing various programs including the program PR. The main control portion 70 collectively controls the image reading apparatus 11 and gives instructions to each of the portions 71 to 73. A part of some functional portions such as the image processing portion 73 may be configured with hardware.

The transport control portion 71 drives and controls the feeding motor 37 and the transporting motor 38 in accordance with instructions of the main control portion 70. When the feeding roller 33 is rotated by driving the feeding motor 37, the booklet 15 or the document D1, which is set in the document support 13, for example, is fed into the main body 12. When the feeding motor 37 is driven, one driving roller 34A constituting the pair of feeding rollers 34 is rotationally driven, and when the transporting motor 38 is driven, the other separation roller 34B is rotationally driven. In particular, the transport control portion 71 drives and controls the feeding motor 37 and the transporting motor 38 such that the document D1 is transported at a reading speed corresponding to a reading resolution (for example, 300/600 dpi) in a reading area SA in the middle of the transport path 29. For example, when the reading resolution is relatively low (for example, 300 dpi), the booklet 15 or the like is transported at a high speed, and when the reading resolution is relatively high (for example, 600 dpi), the booklet 15 or the like is transported at a low speed.

The reading control portion 72 controls the reading portion 40 via the TG 65 and causes the reading portion 40 to read an image such as the booklet 15. In particular, the reading control portion 72 outputs a pulse signal, which defines operation timings of various operations including the reading operation for the reading portions 42A and 42B, to the TG 65, controls light emission of the light sources 41A and 41B via a light source drive portion (not illustrated), and causes the light sources 41A and 41B to irradiate the reading area SA with the light.

When a digital signal of the image read by the reading portion 40 is input via the AFE 66, the image processing portion 73 temporarily stores the image data based on the input digital signal. By performing a known correction process such as a shading correction on the stored image data, the image processing portion 73 generates the image data for two sides obtained by reading both sides of the booklet 15. The image processing portion 73 performs various corrections such as a gamma correction in addition to the shading correction and stores the corrected image data D in the storage portion 61.

Regarding Booklet File Generation Function

The image reading system 10 includes a booklet file generation function of generating one image file arranged in page order including a pair of cover sheets of the booklet 15 from a plurality of image data D acquired by reading a plurality of times while turning the pages of both sides of the booklet 15 in a double-page spread state for each time.

The host apparatus 100 includes a reading control apparatus 110 configured with software. The reading control apparatus 110 includes a computer 120 that executes the program PR installed in the host apparatus 100. This program PR may be a scanner driver program or may be another support program for enhancing the function of the image reading apparatus 11. The program PR is provided to the user in a state of being stored in a storage medium such as a CD-ROM, a DVD, an optical disk, a USB memory, a portable hard disk, and a portable flash memory. The user connects the storage medium to the computer 120 constituting the host apparatus 100 and installs the program PR from the storage medium. By storing the installed program PR in the storage portion 61, the reading control apparatus 110 is constructed in the host apparatus 100 by the computer 120 that executes the program PR.

As illustrated in FIG. 5, the image reading apparatus 11 includes a main control portion 70 and an image processing portion 73 in order to implement the booklet file generation function. The main control portion 70 includes a display control portion 76, a mode setting portion 77, and a transfer control portion 78. The image processing portion 73 includes a cover sheet determination portion 81, a main text determination portion 82, an optical character recognition portion 83, a page area detection portion 84, a division processing portion 85, an arrangement processing portion 86, a blank sheet remove processing portion 87, a file generation portion 88, and the like.

On the other hand, the reading control apparatus 110 has the same booklet file generation function as the image processing portion 73 on the image reading apparatus 11 side. When the reading control apparatus 110 implements the booklet file generation function, the image reading apparatus 11 outputs the image data D to the host apparatus 100 via a communication cable (not illustrated) via an output IF 64. The image data D is stored in the storage portion 61 in the reading control apparatus 110. The reading control apparatus 110 applies a predetermined process with respect to the image data D, which is read from the storage portion 61, thereby one image file (a booklet file) is generated in which a pair of cover sheets and the main text, which are obtained by reading the booklet 15, are arranged in page order.

The reading control apparatus 110 has the same booklet file generation function as the image reading apparatus 11. That is, the reading control apparatus 110 includes the display control portion 76, the mode setting portion 77, the transfer control portion 78, the cover sheet determination portion 81, the main text determination portion 82, the optical character recognition portion 83, the page area detection portion 84, the division processing portion 85, the arrangement processing portion 86, the blank sheet remove processing portion 87, the file generation portion 88, and the like.

This booklet file generation function performs various determination processes, image division processes, image rearrangement processes, and the like on the image data D received by the host apparatus 100 from the image reading apparatus 11 in which the booklet 15 is read. The booklet file generation function executes a display process of displaying the rearranged image or the like on a preview screen 130, a process of receiving information instructed by the operation of the input portion 101 with the preview screen 130, and the like.

The booklet file generation function may be provided in either the image reading apparatus 11 or the host apparatus 100. In the present embodiment, the image reading apparatus 11 is provided with the booklet file generation function in consideration of the fact that the image reading apparatus 11 is used alone. In the present embodiment, for the purpose of reducing the load of the processes on the image reading apparatus 11 and for enabling the preview screen 130 to be viewed on a large screen of the display portion 102 of the host apparatus 100 operated by the user, the reading control apparatus 110 is provided with this booklet file generation function.

This booklet file generation function is provided in at least one of the image reading apparatus 11 and the reading control apparatus 110. That is, only the image reading apparatus 11 may have the booklet file generation function, or only the reading control apparatus 110 may have the booklet file generation function, or both the image reading apparatus 11 and the reading control apparatus 110 may have the booklet file generation function.

The booklet file generation function includes a display function of displaying the preview screen 130 in FIGS. 6 to 9, in which the user can operate the input portion 101 to manually edit the read image or designate the cover sheet, or the like on the display portion 102. The images, which are rearranged by the reading control apparatus 110, may be displayed on the display portion 22 of the image reading apparatus 11, and conversely, the images, which are rearranged by the image reading apparatus 11, may be displayed on the display portion 102.

Regarding Components of Booklet File Generation Function

Hereinafter, the components of the booklet file generation function will be described in order with reference to FIG. 5. Since the configuration of the booklet file generation function is basically the same for the image reading apparatus 11 and the reading control apparatus 110, the booklet file generation function provided in the reading control apparatus 110 will be described below as an example. Although the input portions 21 and 101, which are operated by the user to give instructions, and the display portions 22 and 102, on which the preview screen 130 and the like for previewing the reading (scanning) result of the booklet 15 are displayed, are different from each other, the details of the processes performed in the apparatuses are basically the same.

The display control portion 76 controls the display content of the display portion 102. When the user inputs an operation signal operated by the input portion 101, the display control portion 76 performs display control of displaying a setting screen corresponding to the operation signal on the display portion 102. The display control portion 76 displays, for example, the setting screen (not illustrated) in response to the operation signal from the input portion 101. The display control portion 76 performs the display control for displaying the preview screens 130 illustrated in FIGS. 6 to 9, which display the reading result (the scan result) obtained by reading the booklet 15, on the display portion 102. The preview screen 130 is a confirmation screen for determining whether or not the user may generate one file in which the reading results are combined into one file. By operating the input portion 101 on the preview screen 130, the user can perform editing such as changing the page order, designating the cover sheet or the back cover sheet, and the like. The details of the preview screen will be described later.

The mode setting portion 77 is configured such that a normal mode, in which the document Dl having a single sheet is read and an image file is generated, and a booklet generation mode, in which the booklet 15 is read and an image file including cover sheet image data HD and main text image data CD is generated, can be selected by the input portions 21 and 101. The mode setting portion 77 sets one mode selected by the user by operating the input portions 21 and 101, among a plurality of modes. For example, when the mode setting portion 77 receives an operation signal in which the booklet generation mode is selected by operating the input portion 101 on the setting screen displayed on the display portion 102, the mode setting portion 77 sets the booklet generation mode. With this setting, the image reading apparatus 11 shifts from, for example, the normal mode to the booklet generation mode.

The transfer control portion 78 may be provided in the reading control apparatus 110 in the same manner as the image reading apparatus 11. The transfer control portion 78 controls to transfer of a file, which is generated as one file from the image data of the reading result obtained by reading by the reading portion 40 of the image reading apparatus 11 with a designated format, to a designated transfer destination. For example, when a folder in the host apparatus 100 is designated as the transfer destination, the transfer control portion 78 transfers and saves a file such as booklet reading data to the designated folder. When email transfer is designated, the transfer control portion 78 performs email transfer on a file such as an image file of a booklet to a designated address.

Next, with reference to FIG. 5, among the components of the booklet file generation function, components, which are related to the function of generating an image file of the booklet 15 by performing a predetermined process on the image data D acquired by reading both sides of the booklet 15 in the double-page spread state, will be described.

The cover sheet determination portion 81 determines whether or not the image data D, which is stored in the storage portion 61, is the cover sheet image data HD in which the cover sheets 15A and 15B are read. That is, among the image data obtained by reading both sides of the booklet 15 by the first reading portion 42A and the second reading portion 42B, the cover sheet determination portion 81 determines whether or not the image data is the cover sheet image data HD that includes a cover sheet image H1 and a back cover sheet image H2. The cover sheet image H1 is an image obtained by reading the cover sheet 15A, and the back cover sheet image H2 is an image obtained by reading the back cover sheet 15B. The cover sheet image data HD, which is determined by the cover sheet determination portion 81 based on a double sided image of the booklet 15 read by the first reading portion 42A and the second reading portion 42B, is not limited to including both the cover sheet image H1 and the back cover sheet H2. The cover sheet image data HD may include only the cover sheet image H1 or only the back cover sheet image H2. The details of the determination method in which the cover sheet determination portion 81 determines whether or not the image data D is the cover sheet image data HD will be described later.

The cover sheet determination portion 81 compares a first image SD1 and a second image SD2, which are acquired in the first scan, with a first image SD1 and a second image SD2, which are acquired in the second scan, and determines whether or not matching images SDi (where i is 1 or 2) are present within an allowable range. As a result of comparing the first image SD1 and the second image SD2 of the first scan with the first image SD1 and the second image SD2 of the second scan, when matching images SDi are present within the allowable range, the matching images SDi are set as the cover sheet image data HD. Specifically, as a result of comparing a first image SD1 and a second image SD2 of the k-th scan (where k is 1, 2, 3, . . . , N−1) with a first image SD1 and a second image SD2 of the (k+1)-th scan, it is determined whether or not matching images SDi are present within the allowable range. When the matching images SDi are not present within the allowable range, the above determination is performed in each scan until matching images are present. When the matching images SDi are present within the allowable range, the cover sheet determination portion 81 does not perform the determination process after the next scan.

By the way, the reason why the matching images SDi are not present within the allowable range is a case where the user sets the booklet 15 in an orientation different from the previous time. In this case, since the orientation of the present time image data D (SD1, SD2) is inverted up and down, matching is not established when compared with the previous time image data D (SD1, SD2). In order to avoid the inconvenience that the cover sheet image data HD cannot be obtained because the booklet 15 is set in a wrong orientation by the user, an inversion handling process is performed in which the set orientation of the booklet 15 is inverted with respect to the present time ((k+1)-th) image data D by the image processing. Thereafter, the present time ((k+1)-th) image data D after the inversion handling process and the previous time (k-th) image data D are compared with each other. A target of the inversion handling process may be either the present time ((k+1)-th) image data or the previous time (k-th) image data D, and the inversion handling process may be performed only at the previous time (k-th) image data D. The details of this inversion handling process will be described later.

After the cover sheet determination portion 81 determined that the image data D is the cover sheet image data HD, when the image data D obtained by the next and subsequent readings is the same as the cover sheet image data HD, the image data D may not be stored in the storage portion 61. After the cover sheet determination portion 81 determined that the image data D is the cover sheet image data HD, in the next and subsequent readings, the image data D, which is obtained from the reading portion, among the two reading portions 42A and 42B, when the cover sheets 15A and 15B are read before the previous time, may not be stored in the storage portion 61 (see FIG. 17). For example, after the cover sheet determination portion 81 determined that the image data D is the cover sheet image data HD, the image reading apparatus 11 may be configured to be switched to a single sided reading for reading only a side of the main text of the booklet 15 in an open state, and the cover sheet determination portion 81 may be configured not to perform the determination process.

When the cover sheet determination portion 81 determines that the image data D is the cover sheet image data HD, the cover sheet determination portion 81 determines the cover sheet image H1 and the back cover sheet image H2 among the cover sheet images H1 and H2 of two pages included in the cover sheet image data HD. At a stage in which the cover sheet determination portion 81 determines that the image data D is the cover sheet image data HD, one of the two cover sheet images H1 and H2 included in the cover sheet image data HD is a cover sheet candidate, and the other is a back cover sheet candidate. That is, it is not yet determined which is the cover sheet image H1 and which is the back cover sheet image H2, among the two cover sheet images H1 and H2 included in the cover sheet image data HD. The determination method of determining the cover sheet image H1 and the back cover sheet image H2 will be described later. In the present specification, the cover sheet image H1 may be referred to as "cover sheet image data H1" or simply a "cover sheet H1", and the back cover sheet image H2 may be referred to as "back cover sheet image data H2" or simply a "back cover sheet H2".

Figure 12:
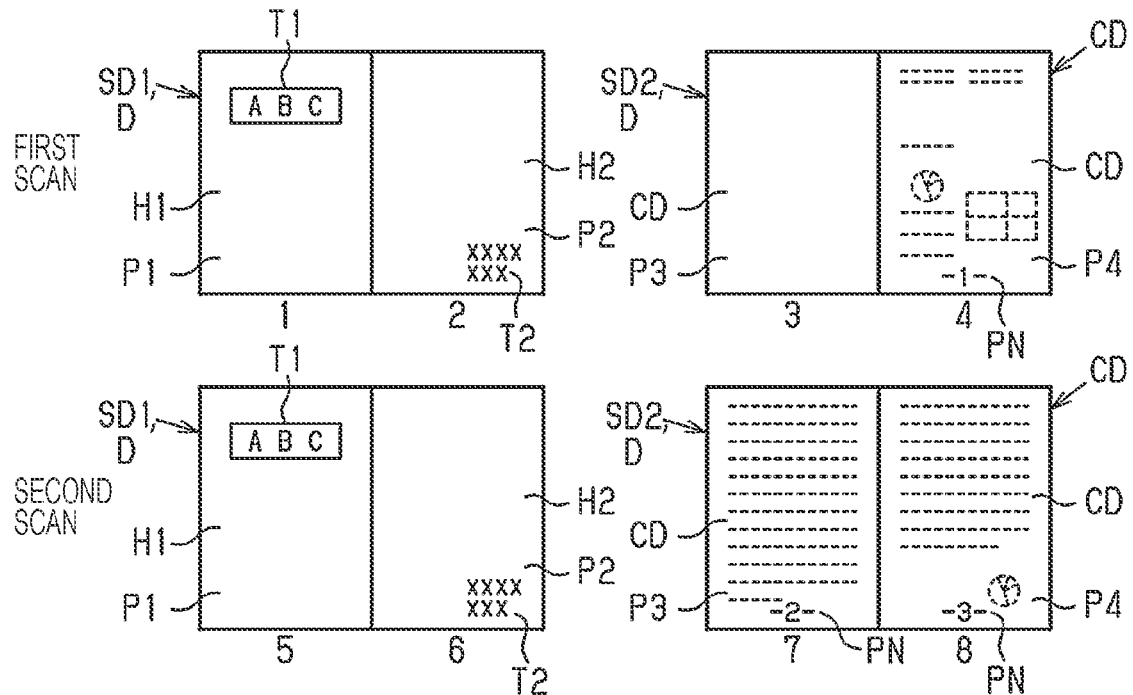
FIG. 12 is a schematic diagram illustrating first and second scanned images (the read images).

Of the image data D stored in the storage portion 61, the main text determination portion 82 determines a back side of a side, which is determined as the cover sheet by the cover sheet determination portion 81, as the main text image data CD (see FIG. 12). In other words, the main text determination portion 82 determines the image data of the back sides of the cover sheets 15A and 15B, which are reading sources of the cover sheet image data HD determined by the cover sheet determination portion 81 among the image data D stored in the storage portion 61, as the main text image data CD. In the following, the main text image data CD may be simply referred to as a "main text image CD" or a "main text CD".

The optical character recognition portion 83 performs a process of extracting characters with respect to the image data D of the booklet 15 read by the reading portion 40 and converting the extracted characters into text data. The optical character recognition portion 83 has a character recognition function of recognizing characters (text) in the image data D and a character code conversion function of converting characters, which are recognized by using the character recognition function, into text data (character code). The optical character recognition portion 83 may have only the character recognition function.

The determination method in which the cover sheet determination portion 81 determines the cover sheet image H1 and the back cover sheet image H2 from the cover sheet candidates, will be described. The character recognition function, which is included the optical character recognition portion 83, is used for this determination. The pair of cover sheets of the booklet 15 is a cover sheet 15A and a back cover sheet 15B. The cover sheet image data HD includes two areas, a cover sheet candidate and a back cover sheet candidate. The optical character recognition portion 83 acquires a page number of a back side of the cover sheet candidate and a page number of a back side of the back cover sheet candidate in the main text image data CD. The cover sheet determination portion 81 determines that an image having a smaller page number value is the cover sheet image H1 (the cover sheet 15A) and determines that an image having a larger page number value is the back cover sheet image H2 (the back cover sheet 15B).

Next, the inversion handling process, which is performed by the cover sheet determination portion 81 for avoiding that the cover sheet image data cannot be obtained when the booklet 15 is set in a wrong orientation in an inverted manner by the user, will be described. The cover sheet determination portion 81 compares the image data D, which is read at the previous time (k-th) scan, with the image data D, which is read at the present time ((k+1)-th) scan, and performs the above-described inversion handling process when a matching image SDi is not present within the allowable range. Specifically, when the cover sheet image data HD cannot be determined, the cover sheet determination portion 81 determines whether or not the image data is the cover sheet image data HD by comparing the image data, which is read at the present time ((k+1)-th), with the image data, which is read before the previous time (k-th). When the cover sheet determination portion 81 cannot determine that the image data is the cover sheet image data HD, the cover sheet determination portion 81 rotates one of two image data, which are the image data D that is read at the present time ((k+1)-th) and the image data D that is read before the previous time (k-th), by half a turn, and then compares the two image data again. For example, the cover sheet determination portion 81 performs a half rotation on the image data D read at the present time ((k+1)-th) scan, and then re-compares the image data D after being rotated by half a turn with the image data D read at the previous time (k-th) scan.

Other inversion handling processes may be performed. For example, in the inversion handling process, the histogram data, which is generated by a histogram generation portion (not illustrated) included in the reading control apparatus 110, is used. The histogram data of the image data D (the first image SD1) acquired at the previous time (k-th) scan and the histogram data of the image data D (the first image SD1) acquired at the present time ((k+1)-th) scan are compared to determine whether or not matching is established. When both the histogram data match within the allowable range, the cover sheet determination portion 81 determines the image data (the first image SD1) at that time as the cover sheet image data HD. The histogram data, which is used at this time, may be RGBY 4 color histogram data or may be monochrome histogram data.

Figure 18:
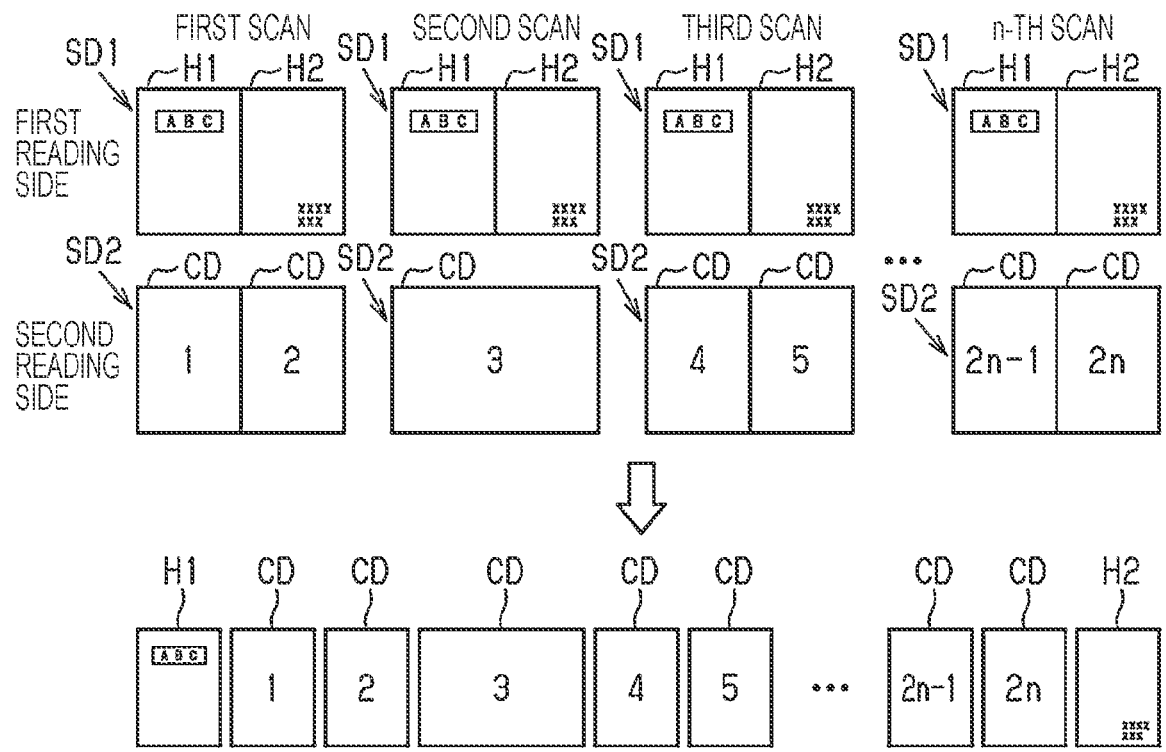
FIG. 18 is a schematic diagram describing scanned images and the rearrangement process when an image becomes two pages.
Figure 19:
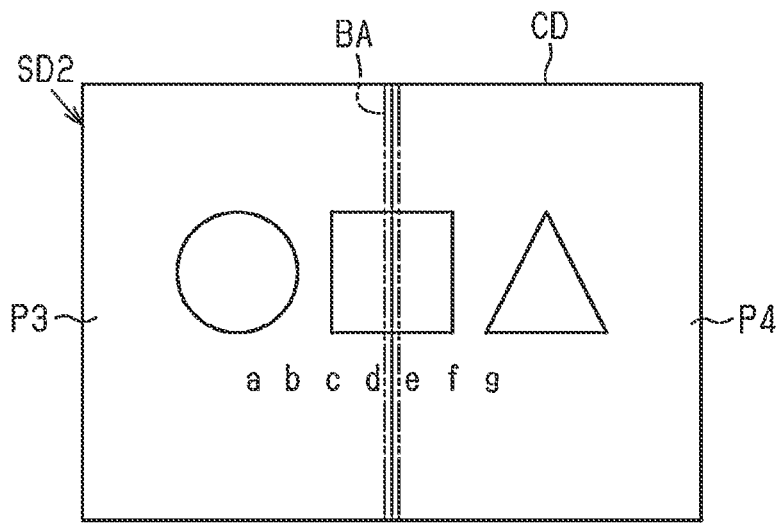
FIG. 19 is a schematic diagram illustrating a scanned image in which the image becomes two pages.

The page area detection portion 84 detects the presence or absence of an image in a boundary part BA (see FIG. 19) of the two page candidate areas included in the main text image data. For example, as illustrated in FIGS. 18 and 19, in some cases, the main text is included in which a size of one page is double the size of the cover sheet H1. In this case, the image data D (the second image SD2) read in one scan becomes one page. Therefore, the image data D should not be divided into two parts.

The division processing portion 85 illustrated in FIG. 5 performs a division process of dividing the first image SD1 and the second image SD2 into two parts to the same size as the size of the cover sheet. Regarding the main text image data CD (for example, the second image SD2), the division processing portion 85 sets the cover sheet size to one page, divides the main text image data CD according to the cover sheet size, and then divides the main text image data CD into two main text images CD for each page.

In the present example including the page area detection portion 84, based on the detection result of the page area detection portion 84, the division processing portion 85 divides the main text image data according to the cover sheet size when an image is not present in a boundary part BA (see FIG. 19) of the two page candidate areas having the cover sheet size included in the second image SD2, which is the main text image data. On the other hand, based on the detection result of the page area detection portion 84, when an image is present in the boundary part BA, the division processing portion 85 does not perform the division process of dividing the main text image data according to the cover sheet size. That is, the second image SD2, which is the main text image data, is treated as one page as it is without dividing the second image SD2, where a size thereof is double the size of the cover sheet.

The arrangement processing portion 86 performs an arrangement process of rearranging the image data at a page order arrangement position of the booklet 15 based on the determination results of the cover sheet determination portion 81 and the main text determination portion 82. The arrangement processing portion 86 performs an arrangement process of rearranging the cover sheet image data and the main text image data at the page order arrangement position of the booklet 15. In the arrangement process, the arrangement processing portion 86 divides the cover sheet image data HD into two parts corresponding to the pair of cover sheets 15A and 15B to arrange the two parts at the front and the end, respectively, and arranges the main text image data CD between the front and the end. In other words, the arrangement processing portion 86 arranges the pair of cover sheet image data H1 and H2 at the front and the end, respectively, and arranges the main text image data CD between the pair of cover sheet image data H1 and H2.

Based on the detection result of the page area detection portion 84, when an image is not present in the boundary part BA, the arrangement processing portion 86 performs the arrangement process of rearranging the image data D (the main text CD) obtained after the division processing portion 85 has divided the main text image data CD according to the cover sheet size. On the other hand, based on the detection result of the page area detection portion 84, when an image is not present in the boundary part BA, the arrangement processing portion 86 performs the arrangement process of rearranging the image data D, which is obtained after the division process, without the division processing portion 85 dividing the main text image data CD according to the cover sheet size. That is, when a main text image CD in which a size thereof is double the size of the cover sheet is present, the arrangement processing portion 86 rearranges the main text image CD, in which the size thereof is double the size of the cover sheet, and the main text image CD, in which the size thereof is the same size as the size of the cover sheet divided by the division processing portion 85, between the pair of cover sheet image data H1 and H2.

The arrangement processing portion 86 performs a process of changing the vertical orientation of at least one of the cover sheet image data HD and the main text image data CD based on an orientation of the character information of the cover sheet H1 acquired by the optical character recognition portion 83 or an orientation of the character information of the main text CD acquired by the optical character recognition portion 83. The arrangement processing portion 86 may perform a change of the vertical orientation of the main text image data CD or perform rearrangement of the page order, based on the information related to the cover sheet/back cover sheet of the main text image data CD. The arrangement processing portion 86 may perform a change of the vertical orientation of the main text image CD or perform rearrangement of the page order, based on the character recognition information obtained by the optical character recognition portion 83 recognizing characters with respect to the main text image CD.

The blank sheet remove processing portion 87 determines whether or not a blank sheet page is present for each page based on the image data D. When it is determined that a blank sheet page is present, the blank sheet remove processing portion 87 performs a process of removing the blank sheet page. In the present example, the blank sheet remove processing portion 87 performs a blank sheet remove process on the image data D after the division processing portion 85 divides the image into page-based images. The blank sheet remove process, which is performed by the blank sheet remove processing portion 87, may be performed before or after the arrangement process performed by the arrangement processing portion 86.

The file generation portion 88 generates one image file that is combined into one file from the image data D rearranged by the arrangement processing portion 86 using the arrangement process. The file generation portion 88 generates an image file in a saving format designated by the operation of the input portions 21 and 101 by the user.

In this way, the image file, which is generated in the host apparatus 100, is saved in a saving destination designated by the user or is transferred by the transfer control portion 78. On the other hand, when the image file is generated in the image reading apparatus 11 by using the booklet file generation function in the image reading apparatus 11, the control portion 50 stores or transfers the image file to the saving destination via the output IF 64 and through the host apparatus 100. The image reading apparatus 11 may store or transfer the image file, which is generated by the image processing portion 73, to the saving destination without going through the host apparatus 100.

Regarding Preview Screen 130

Next, the preview screen 130 will be described with reference to FIGS. 6 to 9. The preview screen 130 illustrated in FIGS. 6 to 9 is a screen in which the user checks the reading result, and an editing function such as designating the cover sheet as needed, changing the page order of images, and deleting unnecessary page images, is included. The user checks the reading result of the booklet 15 on the preview screen 130 and edits the reading result as necessary before generating one image file in which the reading results for each page are combined into one. The user performs editing by operating the input portion 101 on the preview screen 130.

Figure 6:
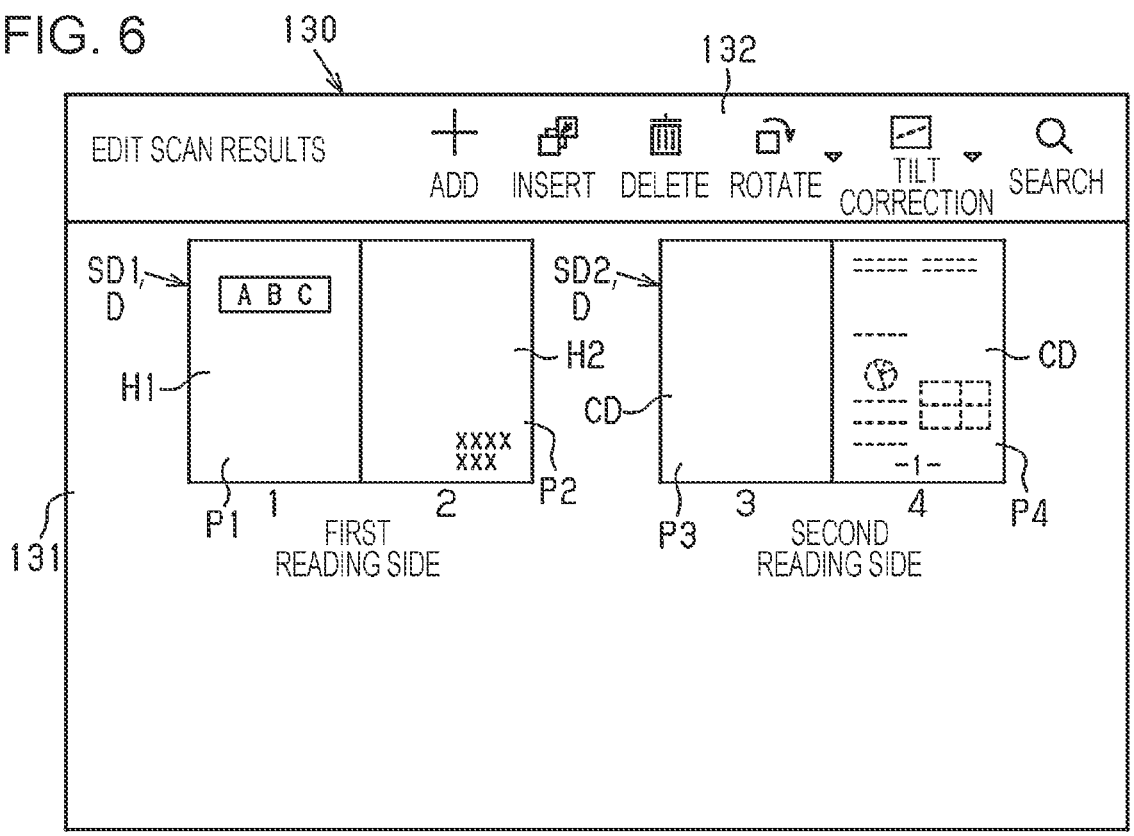
FIG. 6 is a diagram illustrating a preview screen displaying a first scan result.

FIG. 6 illustrates the preview screen 130 displayed on the display portion 102 when the first scan is ended. The preview screen 130 includes a display area 131 in which a reading result of the document D1 or the booklet 15 is displayed, and a selection portion 132 in which an editing item for editing the reading result or an arrangement order of the reading results can be selected. The user can select a selection item in the selection portion 132 by operating the input portion 101. The user can apply editing to the reading result displayed in the display area 131 by operating the input portion 101 under a state in which the selection item is selected.

On the preview screen 130 when the first scan illustrated in FIG. 6 is ended, a first image SD1 in which a first side of the booklet 15, which is in a state of being opened, is read as a first reading side, and a second image SD2 in which a second side of the booklet 15 is read as a second reading side, are displayed. In the example in FIG. 6, the first image SD1 is an image including the cover sheet H1 and the back cover sheet H2, and the second image SD2 is an image including the main text CD. In the first scan, the cover sheet determination portion 81 cannot yet specify the cover sheet H1 and the back cover sheet H2. Therefore, the first image SD1 and the second image SD2 are displayed on the preview screen 130.

Figure 7:
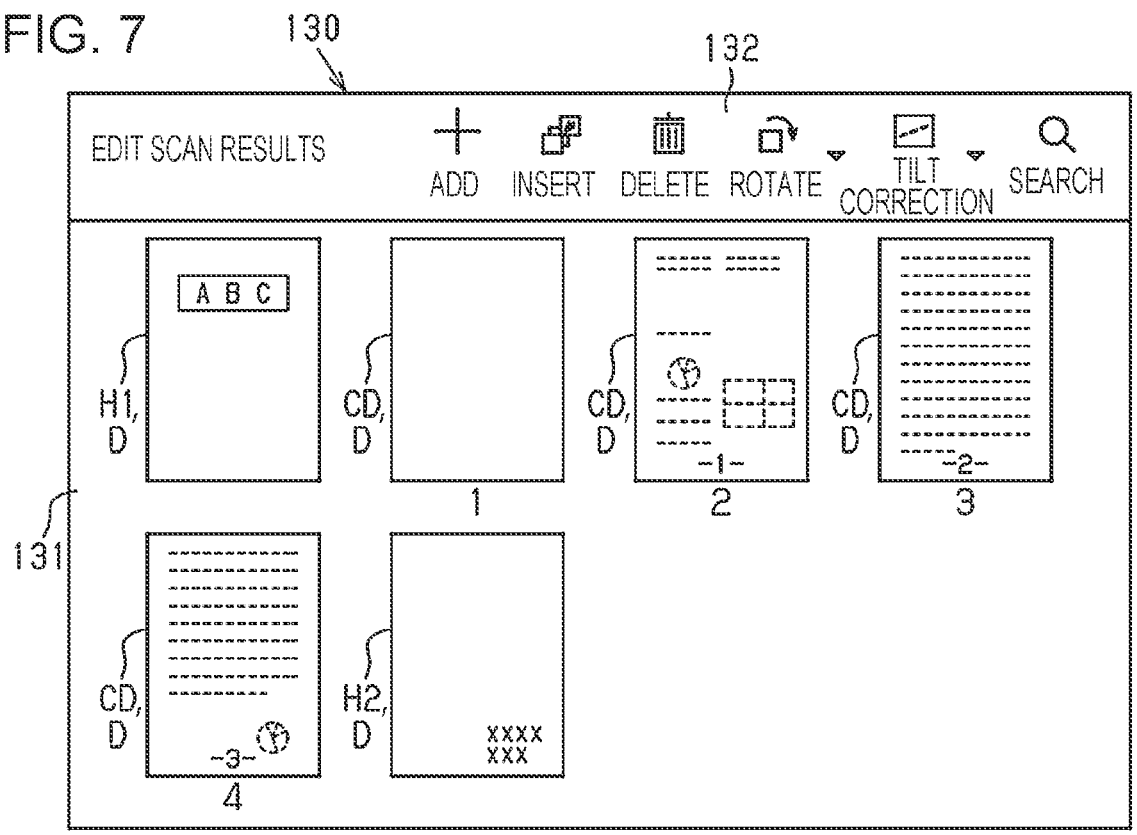
FIG. 7 is a diagram illustrating a preview screen displaying a second scan result.

FIG. 7 illustrates the preview screen 130 displayed on the display portion 102 when the second scan is ended. When the second scan is ended, the cover sheet determination portion 81 can specify the cover sheet H1 and the back cover sheet H2. By specifying the cover sheet H1 and the back cover sheet H2, the main text determination portion 82 can specify the main text CD. Therefore, the arrangement processing portion 86 can perform the arrangement process of arranging the cover sheet H1 at the front, arranging the back cover sheet H2 at the end, and arranging the main texts CD in page order between the cover sheet H1 and the back cover sheet H2. Therefore, as illustrated in FIG. 7, as a result of the arrangement process, a preview image in which the main texts CD are arranged in page order between the cover sheet H1 at the front and the back cover sheet H2 at the end, is displayed on the preview screen 130.

Figure 8:
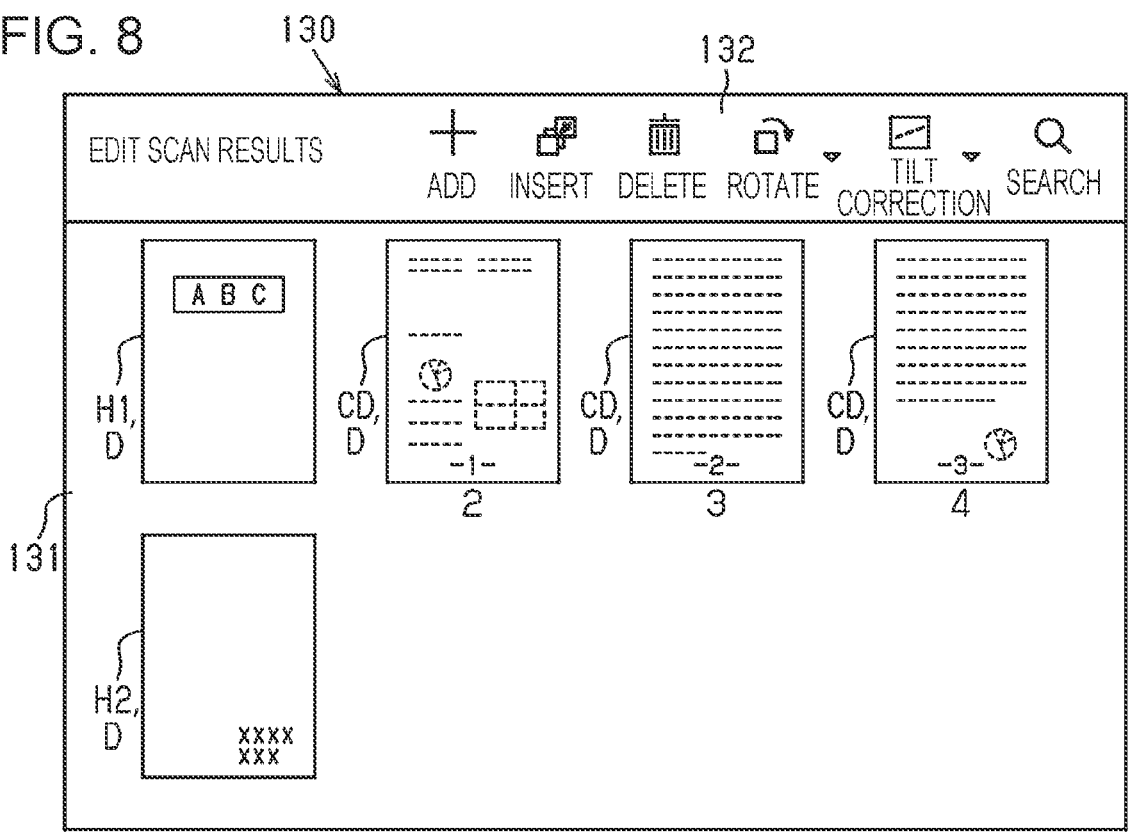
FIG. 8 is a diagram illustrating a preview screen after performing a rearrangement process on the second scan result.

On the preview screen 130 illustrated in FIG. 8, the result of the blank sheet page being deleted by the blank sheet remove processing portion 87 is displayed as a preview image. On the preview screen 130 illustrated in FIG. 8, a blank sheet page allocated to the first page, among a plurality of main texts CD illustrated in FIG. 7, is removed. The user also configures a setting in which blank sheets are not removed when a blank sheet remove function is disabled.

Figure 9:
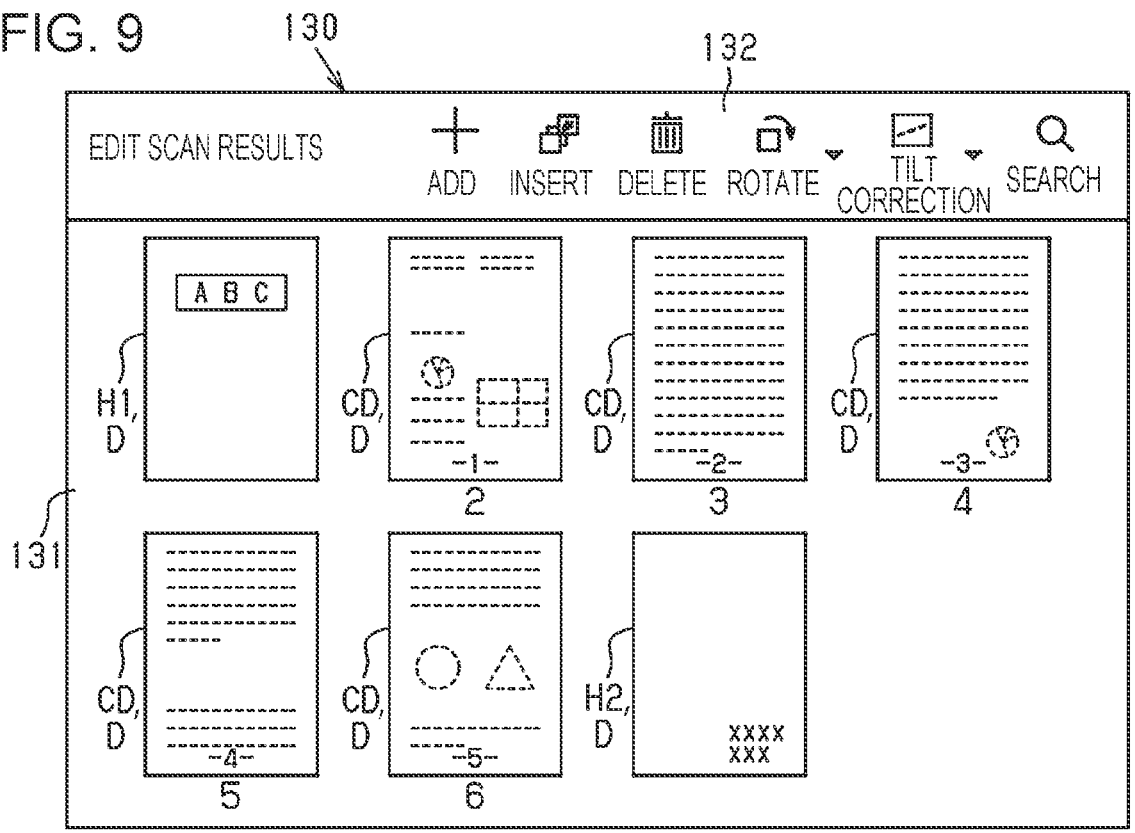
FIG. 9 is a diagram illustrating a preview screen after performing the rearrangement process on the third scan result.

FIG. 9 illustrates the preview screen 130 displayed on the display portion 102 when the third scan is ended. Of the first image SD1 and the second image SD2 acquired in the third scan, the cover sheet image data HD, which is determined by the cover sheet determination portion 81, is discarded, and two main texts CD, which are obtained by dividing the main text image data CD that is determined by the main text determination portion 82 into the page size, are added to the page order arrangement positions.

After all the scans are ended up to the N-th time (where, N is a natural number that satisfies 21\T) in this way, the user checks the preview screen 130 and, when it is acceptable, operates the input portion 101 to switch the screen to the transfer destination selection screen 140 illustrated in FIG.

10. The transfer destination selection screen 140 illustrated in FIG. 10 is displayed on the display portion 102.

Figure 10:
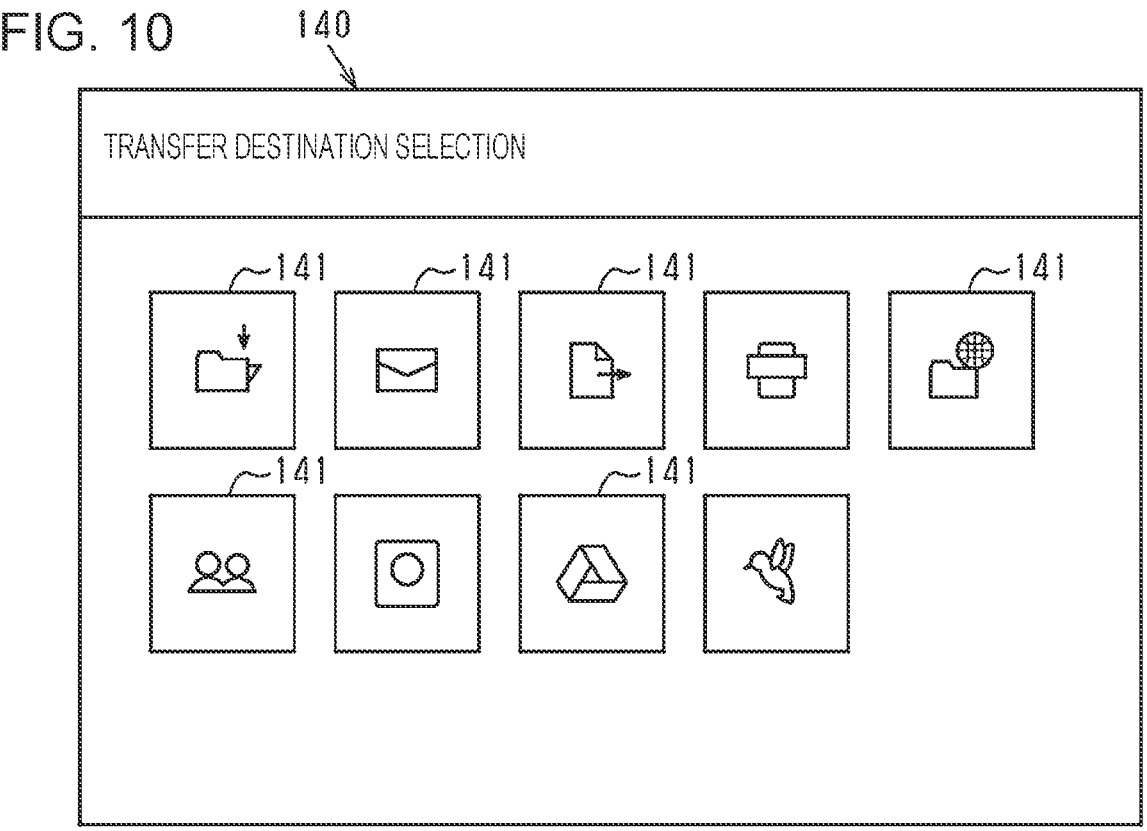
FIG. 10 is a diagram illustrating a transfer destination selection screen.

As illustrated in FIG. 10, the transfer destination selection screen 140 is provided with a plurality of selection buttons 141. The plurality of selection buttons 141 are buttons for selecting a transferring method. In the present example, the transferring methods include a save-in-folder of saving data in folders of the host apparatus 100, an email transfer, a WiFi transfer of transferring by WiFi communication, and the like. The transfer destination selection screen 140 is provided with the plurality of selection buttons 141 corresponding to these transferring methods. By operating the input portion 101, the user selects one of the plurality of selection buttons 141 corresponding to the desired transferring method. The reading control apparatus 110 registers the transferring method designated by the user based on an operation signal input from the input portion 101. When the selection button 141 is selected, an input screen on which an address of a transfer destination can be designated is displayed on the display portion 102. When the user inputs an address of a transfer destination by operating the input portion 101, the reading control apparatus 110 registers the address of the transfer destination.

Cover Sheet Determination Method

The image data D, which is stored in the storage portion 61 includes: first image data SD1 (a first image SD1) obtained by reading a first side of the booklet 15, which is in a double-page spread state, by the first reading portion 42A; and second image data SD2 (a second image SD2) obtained by reading a second side of the booklet 15, which is in a double-page spread state, by the second reading portion 42B. Further, the image data D also includes each image data D of the cover sheet H1 and the back cover sheet H2 obtained by dividing the image data SD1 and SD2 into pages of half the size thereof.

Figure 11:
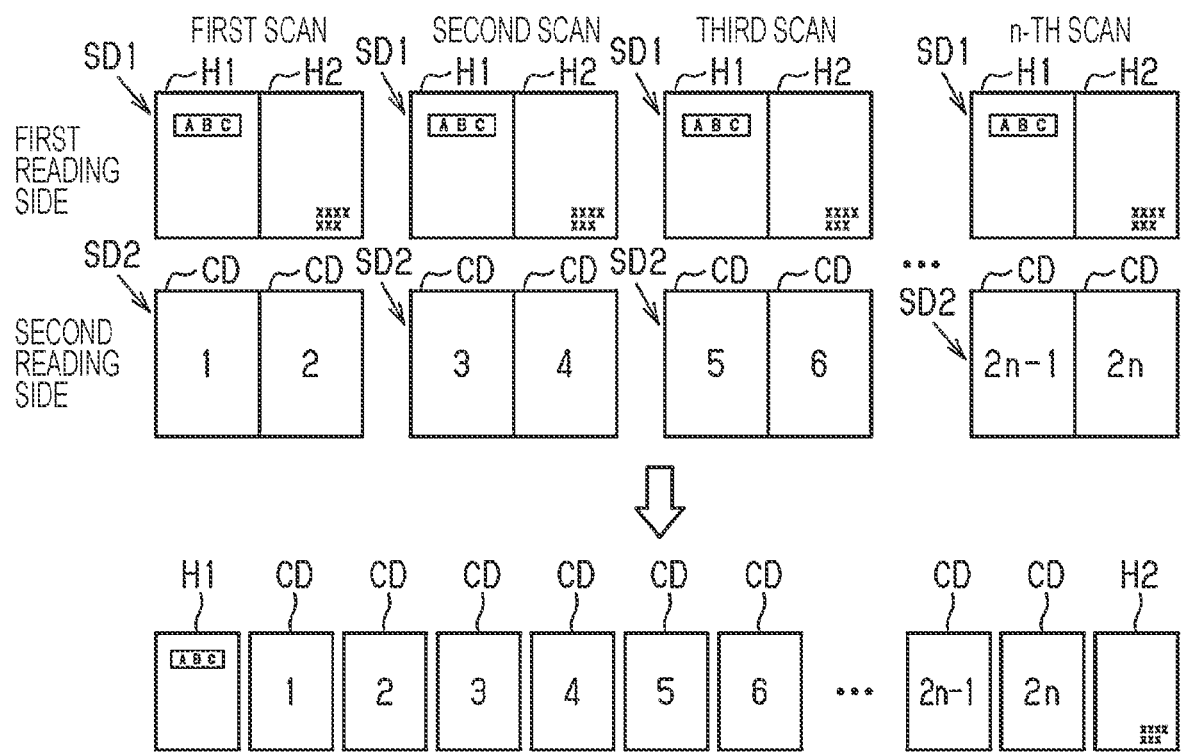
FIG. 11 is a schematic diagram describing scanned images and the rearrangement process.

For example, as illustrated in FIGS. 11 and 12, the first image data SD1 and the second image data SD2 are acquired in one scan (reading). The first image data SD1 includes a cover sheet image H1 and a back cover sheet image H2 having half the size thereof. In this case, the first image data SD1 is the cover sheet image data HD. The second image data SD2 includes two pages of the main text image CD having a half size as one page. The cover sheet image H1 refers to an image of the cover sheet 15A, and the back cover sheet image H2 refers to an image of the back cover sheet 15B. The main text image CD refers to an image of the main text 15D.

As illustrated in FIG. 12, the first image data SD1 includes a first page area P1 and a second page area P2, which have half the size thereof. The first page area P1 is an area read before the second page area P2. The second image data SD2 includes a third page area P3 and a fourth page area P4, which have half the size thereof. The third page area P3 is an area read before the fourth page area P4. The page areas P1 to P4 are page candidate areas, and there are cases where two page areas constitute one page of main text image data CD (see FIG. 19).

As illustrated in FIG. 12, the cover sheet H1 includes character data (text data) such as a title T1 (a booklet name) of the booklet 15. The back cover sheet H2 includes character data (text data) of booklet attribute information T2 such as a publisher, an issuer, and a price printed on the back cover sheet 15B of the booklet 15. The main text CD includes an image of a blank sheet page, or an image of a page on which sentences or pictures are printed. The latter main text CD may include a page number PN illustrated in FIG. 12.

The first image data SD1 is obtained by reading the first side of the booklet 15, which is in an open state, by the first reading portion 42A, and the second image data SD2 is obtained by reading the second side of the booklet 15, which is in an open state, by the second reading portion 42B. In the booklet generation mode, since the double sided reading is performed on the booklet 15 that is in the double-page spread state, the first image data SD1 and the second image data SD2 are acquired in one scan. The booklet 15 is set in the image reading apparatus 11 with an orientation in which double-spread sides are positioned on the upper side, and by being fed and transported, both sides of the booklet 15 are read by the reading portion 40 in the reading area SA while being transported. The cover sheet image data HD is acquired by the first reading portion 42A reading the cover sheet 15A and the back cover sheet 15B of the booklet 15. The cover sheet image data HD includes the cover sheet image H1, which is an image of the cover sheet 15A, and the back cover sheet image H2, which is an image of the back cover sheet 15B.

The cover sheet determination portion 81 compares a first image SD1 and a second image SD2, which are obtained by the reading portion 40 reading both sides of the booklet 15 in an open state in the first scan (reading) with a first image SD1 and a second image SD2, which are obtained by the reading portion 40 reading both sides of the booklet 15 in an open state in the second scan, and determines whether or not matching images SDi are present within the allowable range. This allowable range is set in consideration of slight rotational deviation caused by skewing and the like during transport of the booklet 15, and slight differences in image density due to adhesion of foreign matter and the like.

Description of Arrangement Process

Next, the arrangement process of arranging the cover sheet H1 at the front and arranging the back cover sheet H2 at the end will be described with reference to FIGS. 11 to 19. The arrangement process of the present embodiment includes a process of arranging the main texts CD in page order between the cover sheet H1 arranged at the front and the back cover sheet H2 arranged at the end.

FIG. 11 describes the arrangement process when the booklet 15 in a double-page spread state is set in the correct orientation in n times of scan. As illustrated in FIG. 11, the first image data SD1 and the second image data SD2 are read in the same orientation in each scan. Since the first image data SD1 obtained in the first scan and the first image data SD1 obtained in the second scan match within the allowable range, the cover sheet H1 and the back cover sheet H2 are obtained by dividing the first image data SD1. The back side of the cover sheet H1 is defined as the main text CD, and the back side of the back cover sheet H2 is defined as the main text CD. By using the arrangement process, the cover sheet H1 is arranged at the front, the back cover sheet H2 is arranged at the end, and the plurality of main texts CD are arranged in page order between the cover sheet H1 and the back cover sheet H2.

Figure 14:
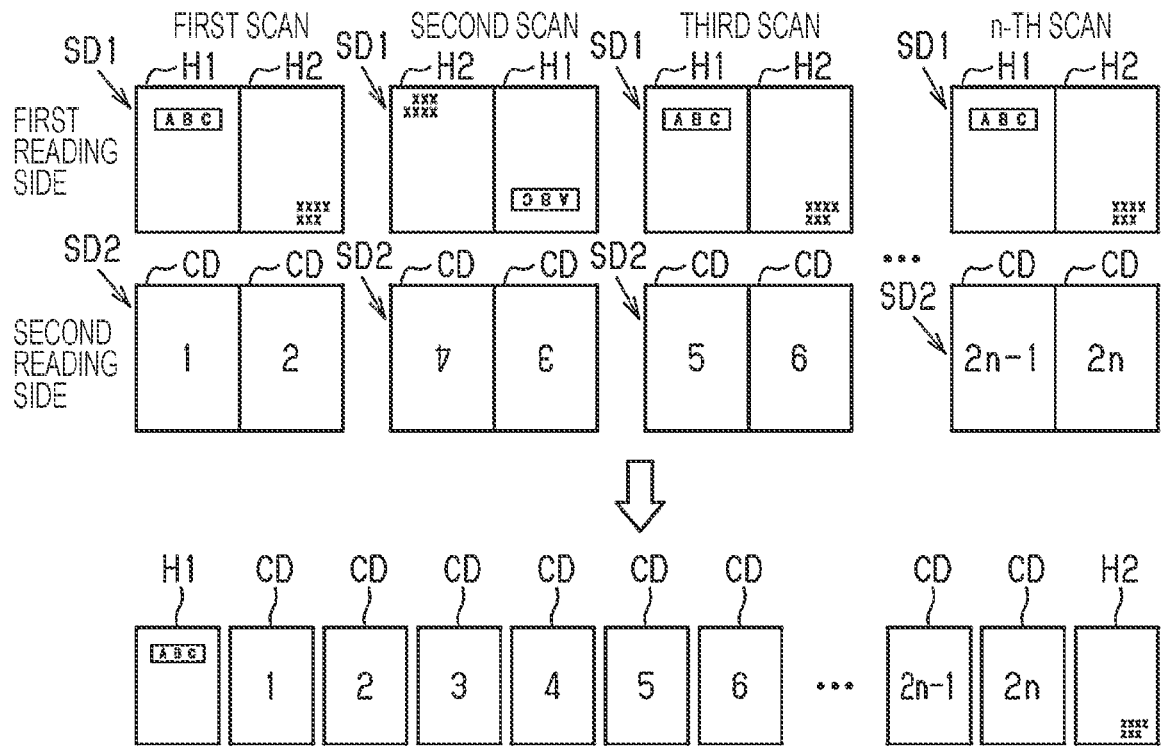
FIG. 14 is a schematic diagram describing scanned images and the rearrangement process when the booklet is set in a wrong orientation by half a turn.
Figure 15:
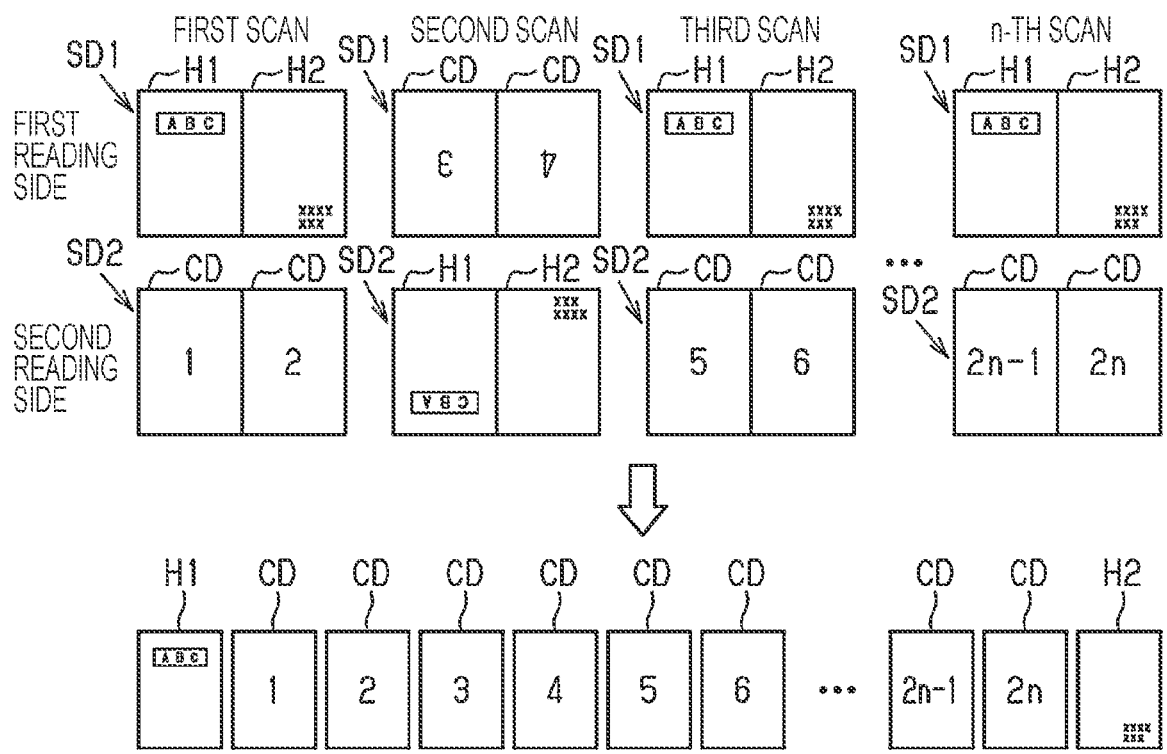
FIG. 15 is a schematic diagram describing scanned images and the rearrangement process when the booklet is set in an inverted manner.

FIGS. 14 and 15 describe the arrangement process when at least one case, in which the booklet 15 that is in the double-page spread state is set in the wrong orientation in n times of scan, is included. FIG. 14 describes an example in which the double-page spread booklet 15 is set in the correct orientation where the cover sheet becomes a lower side but the booklet 15 is set in the wrong orientation by being rotated 180 degrees such that the back cover sheet 15B side is transported first, in the second scan. FIG. 15 describes an example in which the booklet 15 is set in the wrong orientation where the double-spread sides of the double-page spread booklet 15 become lower sides and the cover sheet becomes an upper side, in the second scan. In the examples illustrated in FIGS. 14 and 15, in the cover sheet image data HD including the cover sheet H1 and the back cover sheet H2 obtained in the first scan and the cover sheet image data HD including the cover sheet H1 and the back cover sheet H2 obtained in the second scan, the orientations of the images are opposite.

Therefore, even when the cover sheet determination portion 81 compares the first image SD1 and the second image SD2, which are obtained in the first scan, with the first image SD1 and the second image SD2, which are obtained in the second scan, matching images cannot be found in the allowable range.

Figure 16:
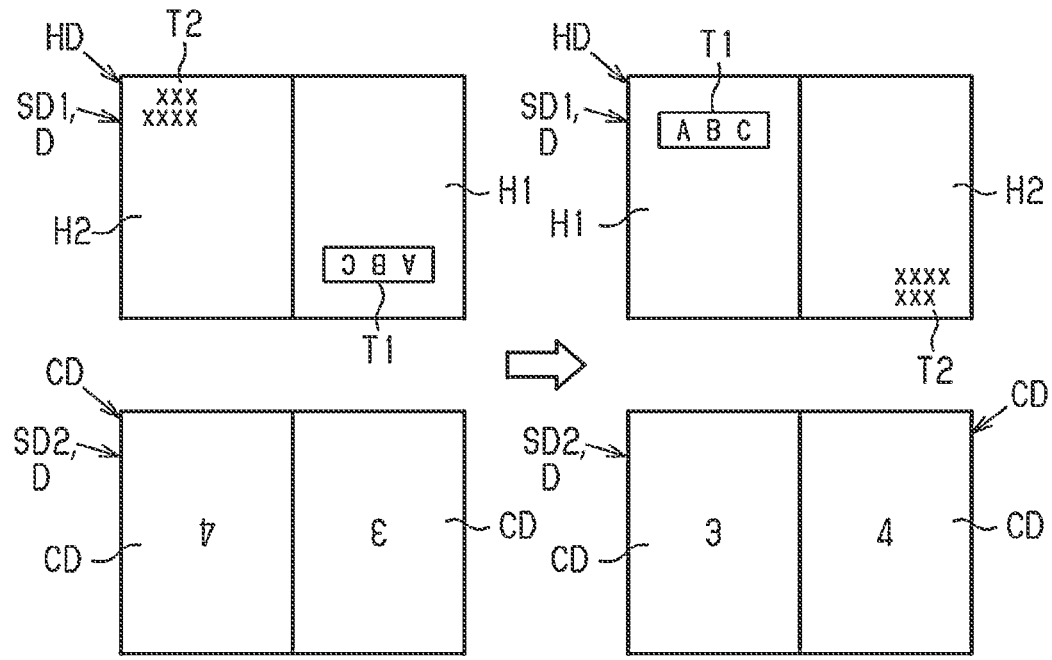
FIG. 16 is a schematic diagram describing a handling process when it is determined that the first and second scanned images do not coincide with each other.

Therefore, as illustrated in FIG. 16, a process is performed in which the first image SD1 and the second image SD2, which are obtained by one of the scans of the first image SD1 and second image SD2 that are obtained in the first scan and the first image SD1 and second image SD2 that are obtained in the second scan, are rotated by half a turn. In the example illustrated in FIG. 16, the first image SD1 and the second image SD2 obtained in the second scan are rotated by half a turn. By the cover sheet determination portion 81 comparing the first image SD1 and the second image SD2, which are obtained in the first scan, with the first image SD1 and the second image SD2, which are illustrated on the right side in FIG. 16 and obtained in the second scan where a half rotation process is performed, the first images SD1 that match within the allowable range are specified as the cover sheet image data HD.

Figure 17:
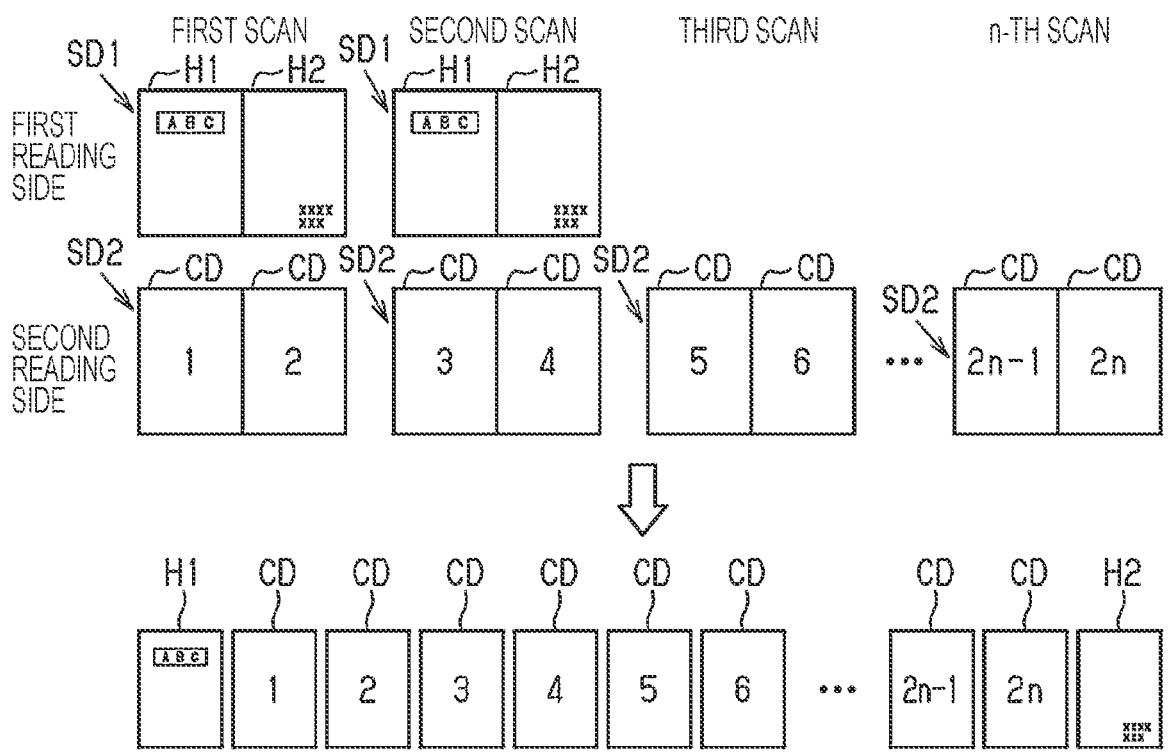
FIG. 17 is a schematic diagram describing scanned images and the rearrangement process including a discard reading process when the first and second scanned images coincide with each other.

FIG. 17 describes an example of performing a process in which the first images SD1 that are obtained in the third and subsequent scans are discarded without being stored in the storage portion 61, after the cover sheet image data HD (the first image SD1) including the cover sheet H1 and the back cover sheet H2 is specified, as the results of the first scan and the second scan. Since the two first images SD1, which are obtained in the first scan and the second scan, are required for the cover sheet determination portion 81 to specify the cover sheet H1 and the back cover sheet H2, the two first images SD1 are stored in the storage portion 61. After the cover sheet H1 and the back cover sheet H2 are acquired, the first image SD1 including the cover sheet H1 and the back cover sheet H2 is not required, thereby, the first images SD1 are discarded in the third and subsequent scans. A configuration may be adopted in which both sides of the booklet 15, which is in an open state, are read in the first scan and the second scan, and in the third scan, the mode is switched from single sided reading to single sided reading where a single side of the booklet 15, which is in an open state, is read. When the mode is switched to the single sided reading, the reading operation may be performed by a reading portion, among the first reading portion 42A and the second reading portion 42B, that reads the main text 15D of the booklet 15, or the cover sheet image data HD, among the image data D obtained by reading both sides of the booklet 15, may be discarded without being stored in the storage portion 61.

FIG. 18 describes an example in which a page whose size is double the normal page size, which becomes one page with the double-page spread state in the booklet 15, is included as the main text CD. As illustrated in FIG. 18, the second image SD2, which is obtained in the second scan, includes the main text CD in which the size thereof is double the size of the cover sheet H1. The page area detection portion 84 detects that the main text CD is one page.

The page area detection portion 84 determines whether or not an image is present in the boundary part BA of the page areas P3 and P4 that are two page candidates illustrated in FIG. 19 included in the main text CD determined by the main text determination portion 82. When the second image SD2 becomes one page as a whole, as illustrated in FIG. 19, an image is present in the boundary part BA. The page area detection portion 84 detects the presence or absence of an image in the boundary part BA based on a density value of the second image SD2. When the page area detection portion 84 detects an image in the boundary part BA, the page area detection portion 84 determines that the size of the main text CD is double the size of the cover sheet. In other words, when the page area detection portion 84 detects a continuous image over the page areas P3 and P4, which are two page candidates in the second image SD2 (the main text image data CD), the page area detection portion 84 determines that the size of the main text CD is double the size of the cover sheet.

Action

Next, the action of the image reading apparatus 11 will be described with reference to FIGS. 20 and 21 and the like. When the user reads the booklet 15, the user operates the input portion 101 in a state in which the setting screen is displayed on the display portion 102 to select the booklet generation mode. The user sets the booklet 15 in the double-page spread state and sets the booklet 15 in the document support 13 with the orientation in which the double-spread sides are positioned on the upper side. The user instructs the image reading apparatus 11 to scan the booklet 15 by operating the input portion 101. The user may instruct the image reading apparatus 11 to perform the reading start by operating the input portion 21.

When the control portion 50 receives the reading start instruction, the control portion 50 causes a computer 120 to execute a scan process routine. The computer 120 instructs a computer 60 of the image reading apparatus 11 to start reading (scanning) the booklet 15.

Hereinafter, a booklet reading process routine will be described with reference to FIGS. 20 and 21 using an example executed by the computer 120 on the reading control apparatus 110 side. When the computer 60 of the image reading apparatus 11 executes the booklet reading process routine, it is basically the same as the process, which is executed by the computer 120 except that the input portion, which is operated by the user, and the display portion, on which screens such as the preview screen 130 are displayed, are different.

First, in step S11, the computer 120 executes the first double-page spread scan. That is, the computer 120 causes the computer 60 to execute the first scan. The computer 60 transports the booklet 15 that is in the double-page spread state, causes the first reading portion 42A to read the first side of the booklet 15 during the transport, and causes the second reading portion 42B to read the second side of the booklet 15. The read image data D is transmitted from the image reading apparatus 11 to the reading control apparatus 110 in the host apparatus 100. The image data D is stored in a storage portion in the computer 120. The computer 120 may display the preview screen 130 illustrated in FIG. 6 on the display portion 102. As illustrated in FIG. 6, on the preview screen 130, the first image SD1 in which the first reading portion 42A reads the first side of the booklet 15, and the second image SD2 in which the second reading portion 42B reads the second side of the booklet 15, are displayed. The booklet 15 is transported in an orientation in which the double-spread sides of the booklet 15, which is in the double-page spread state, are positioned on the upper side and the cover sheet 15A and the back cover sheet 15B become the lower sides. Therefore, the first image SD1 is an image including the cover sheet H1 and the back cover sheet H2. The second image SD2 is an image including the main text image CD of one page on the left side of the double-spread sides of the booklet 15 and the main text image CD of one page on the right side of the double-spread sides of the booklet 15.

In step S12, the computer 120 executes the second double-page spread scan. That is, the computer 120 causes the computer 60 to execute the first scan. The computer 60 transports the booklet 15 that is in the double-page spread state, causes the first reading portion 42A to read the first side of the booklet 15 during the transport, and causes the second reading portion 42B to read the second side of the booklet 15.

In step S13, the computer 120 determines whether or not the same images are present. As illustrated in FIG. 12, the computer 120 compares the first image SD1 and the second image SD2, which are obtained in the first scan, with the first image SD1 and the second image SD2, which are obtained in the second scan. As can be seen from the example illustrated in FIG. 12, the first image SD1 of the first scan and the first image SD1 of the second scan are the same. The computer 120 proceeds to step S14 when the same images are not present, and proceeds to step S16 when the same images are present.

In step S14, the computer 120 executes the inversion handling process. For example, when the reading orientation of the booklet 15 is opposite by 180 degrees in the second scan illustrated in FIGS. 14 and 15, as illustrated in FIG. 16, both the first image SD1 and the second image SD2 have an inverted orientation in which both the first image SD1 and the second image SD2 are rotated 180 degrees. This is because, in FIGS. 14 and 15, the booklet 15 is set on the image reading apparatus 11 in a wrong orientation by the user in the second scan. Therefore, as illustrated in FIG. 16, the computer 120 executes the inversion handling process of rotating both the first image SD1 and the second image SD2, which are obtained in the second scan, by 180 degrees. As a result, by executing the inversion handling process of rotating the images SD1 and SD2, which are on the left side in FIG. 16, by 180 degrees, the images SD1 and SD2 obtained in the second scan are set to the correct orientation.

In step S15, the computer 120 determines whether or not the same images are present. The computer 120 compares the first image SD1 and the second image SD2, which are obtained in the first scan illustrated in FIG. 12, with the first image SD1 and the second image SD2, which are obtained in the second scan where the orientations of the first image SD1 and the second image SD2 are corrected to the correct orientation by using the inversion handling process of step S14. As can be seen from the example illustrated in FIG. 12 and FIG. 16, the first image SD1 of the first scan and the first image SD1 of the second scan are the same. The computer 120 proceeds to step S20 when the same images are not present, and proceeds to step S16 when the same images are present. An example of a case where it is determined that the same images are not present includes rotation shifting of a read image or the like.

In step S16, the computer 120 performs division of the cover sheet/back cover sheet page. As illustrated in FIG. 13, the computer 120 divides the first image SD1, which is determined to be the same image, into the cover sheet H1 in the first page area P1 and the back cover sheet H2 in the second page area P2.

In step S17, the computer 120 determines whether or not the cover sheet can be determined. The computer 120 determines whether or not the cover sheet can be determined by using the above-mentioned methods such as comparison of the character size recognized by the optical character recognition portion 83, comparison of values of the page number on the back side of the cover sheet and the page number on the back side of the back cover sheet, or the like. Specifically, as illustrated in FIG. 13, the cover sheet H1 includes, for example, the title T1, and the back cover sheet H2 includes, for example, the booklet attribute information of a publisher or the like. The character size of the title T1 is larger than the character size of the booklet attribute information T2. A character size of the largest character, among the characters obtained by recognizing characters by the optical character recognition portion 83, larger than a first character size threshold value TS1 is defined as the cover sheet H1, and the character size of the largest character, among the characters obtained by recognizing characters by the optical character recognition portion 83, smaller than a second character size threshold value TS2 (<TS1) is defined as the back cover sheet H2. In this method, when one of the cover sheet candidate and the back cover sheet candidate can be determined to be the cover sheet, the other may be regarded as the back cover sheet, and when one can be determined to be the back cover sheet, the other may be regarded as the cover sheet. As another method, the page number of the back side of the cover sheet candidate and the page number of the back side of the back cover sheet candidate are acquired. As illustrated in FIG. 12, when page numbers are allocated in order from the cover sheet H1 side, it is utilized that the value of the page number on the back side of the cover sheet candidate is smaller than the value of the page number on the back side of the back cover sheet candidate. The computer 120 defines the one having a smaller page number value as the cover sheet, and defines the one having a larger page number value as the back cover sheet. When the computer 120 cannot determine the cover sheet, the computer 120 proceeds to step S18. On the other hand, when the computer 120 can determine the cover sheet, the computer 120 specifies the cover sheet and the back cover sheet and then proceeds to step S19.

In step S18, the computer 120 executes a process of manually designating the cover sheet and the back cover sheet. That is, when the computer 120 cannot determine the cover sheet and the back cover sheet, the computer 120 causes the display portion 102 to display the cover sheet candidate and the back cover sheet candidate on the preview screen 130 and prompts the user to designate the cover sheet and the back cover sheet. The user, who reads a message or the like prompting the user to designate the cover sheet, operates the input portion 101 to designate the cover sheet and the back cover sheet on the preview screen 130. Further, even when the order of the images displayed on the preview screen 130 is not appropriate, the user operates the input portion 101 to designate the cover sheet and back cover sheet on the preview screen 130. The computer 120 determines the cover sheet and the back cover sheet based on the designation information input from the input portion 101 by the operation of the user.

In step S19, the computer 120 allocates the cover sheet and back cover sheet to the first page and the last page. The cover sheet H1 and the back cover sheet H2, which are determined in a process of determining the cover sheet (step S17) or a process of manually designating the cover sheet and the back cover sheet (step S18), are allocated by the computer 120. That is, the computer 120 performs allocation such that the cover sheet H1 is arranged at the front and the back cover sheet H2 is arranged at the end.

In the next step S20, the computer 120 executes the division of the main text page. This process is performed by the division processing portion 85 of the computer 120. The computer 120 divides the main text page, as illustrated on the lower side in FIG. 13. However, as illustrated in FIGS. 18 and 19, there may be a case in which a page whose size is double the size of the cover sheet is present. Therefore, the page area detection portion 84 detects the page area whose size is double the size of the cover sheet. The page area detection portion 84 detects the presence or absence of an image in the boundary part BA (see FIG. 19) of two page candidates included in the main text image data CD (the second image SD2) determined by the main text determination portion 82 as the main text. For example, as illustrated in FIGS. 18 and 19, when the main text, which contains one page whose size is double the size of the cover sheet H1, is included, an image is detected at the boundary part BA between two page candidates in the second image SD2, which is the main text image data CD read by one scan. That is, a continuous image over two page candidates is detected. As a result, the second image SD2 is determined to be one page as a whole. In this case, the second image SD2, which is the main text image data CD, is not divided into two parts.

Figure 21:
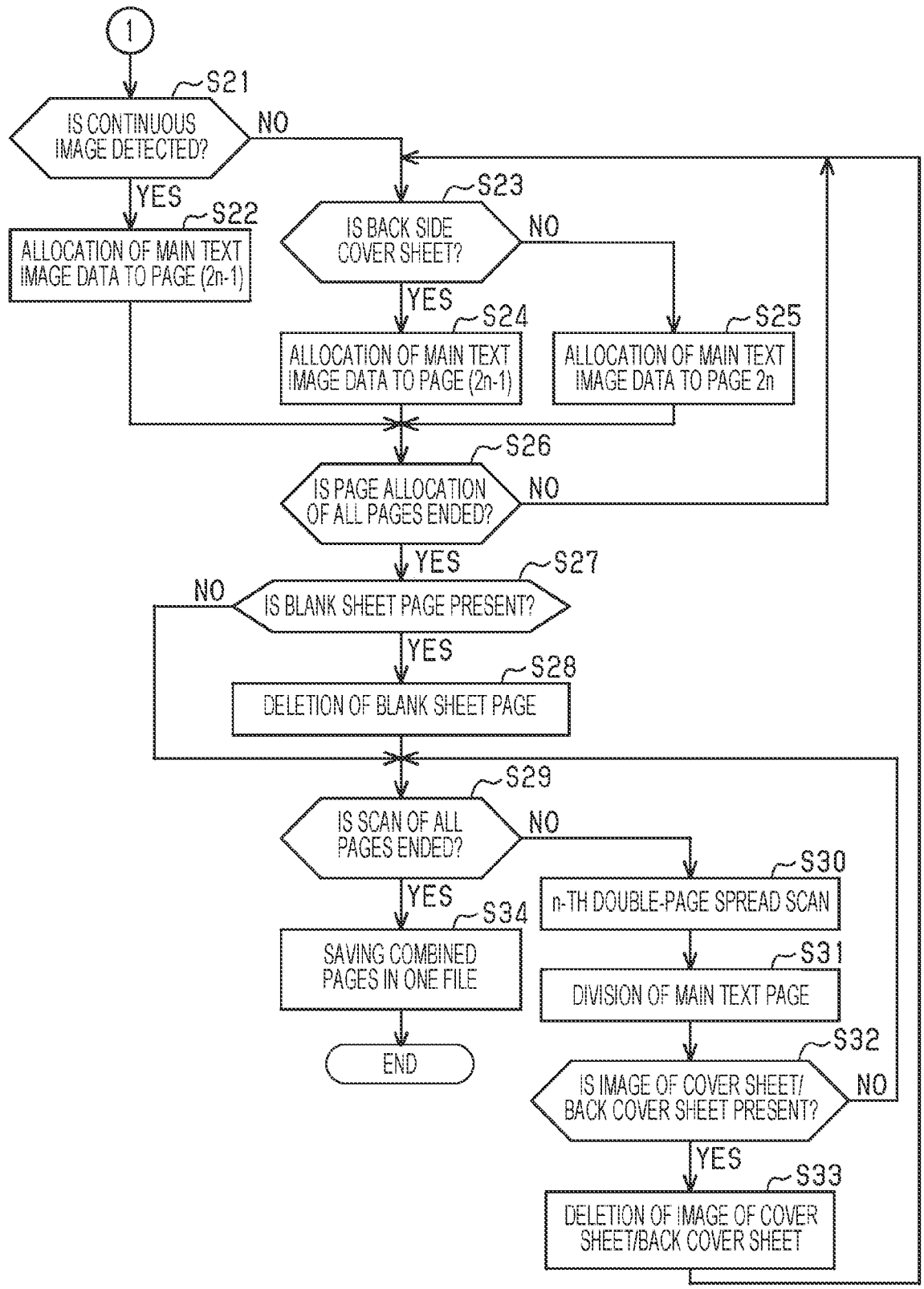
FIG. 21 is a flowchart illustrating processing of the latter half of the booklet reading process routine.

Next, in step S21 illustrated in FIG. 21, the computer 120 determines whether or not a continuous image is detected. When the computer 120 detects a continuous image over two page candidates in the process of the previous step S20, the computer 120 proceeds to step S22. On the other hand, when the computer 120 does not detect a continuous image, the computer 120 proceeds to step S23.

In step S22, the computer 120 allocates the main text image data CD to page (2n-1). That is, the computer 120 allocates the main text image data CD in which a continuous image is detected to page (2n-1).

In step S23, the computer 120 determines whether or not the back side is the cover sheet. The computer 120 proceeds to step S24 when the back side is the cover sheet. On the other hand, the computer 120 proceeds to step S25 when the back side is not the cover sheet.

In step S24, the computer 120 allocates the main text image data CD to page (2n-1). That is, the computer 120 allocates the main text image data CD whose back side is the cover sheet to page (2n-1).

In step S25, the computer 120 allocates the main text image data CD to page 2n. That is, the computer 120 allocates the main text image data CD whose back side is the back cover sheet to page 2n. The page to be allocated is an allocation page used when the arrangement processing portion 86 rearranges the main text image data CD in page order, and values do not necessarily match the page numbers printed in the main text.

In step S26, the computer 120 determines whether or not the page allocation of all the pages is ended. The computer 120 proceeds to step S27 when the page allocation of all the pages is ended. On the other hand, when the page allocation of all the pages is not ended, the computer 120 returns to step S23.

For each scan, basically, there is a main text image data CD whose back side is the cover sheet and a main text image data CD whose back side is the back cover sheet. In this way, there may be a case in which the main text image data CD, which is a page allocation target, has a plurality of pages (for example, two pages) per one scan. In the step S26, the computer 120 determines whether or not the page allocation of all the pages of the main text image data CD is ended. When the page allocation of all the pages is not ended, the computer 120 returns to step S23. On the other hand, the computer 120 proceeds to step S27 when the page allocation of all the pages is ended. By this allocation, the main text image data CD are rearranged in the allocation order in which the pages are allocated. For example, on the display portion 102, the preview screen 130 illustrated in FIG. 7, in which the main text image data CD are rearranged in the allocation order, is displayed by the display control portion 76.

In step S27, the computer 120 determines whether or not a blank sheet page is present. The computer 120 proceeds to step S28 when a blank sheet page is present. On the other hand, when a blank sheet page is not present, the computer 120 proceeds to step S29.

In step S28, the computer 120 deletes a blank sheet page. The processes of step S27 and step S28 performed by the computer 120 are performed by the blank sheet remove processing portion 87. By the process of removing the blank sheet page, the preview screen 130 illustrated in FIG. 7 is switched to the preview screen 130 illustrated in FIG. 8 in which a blank sheet page is removed.

In step S29, the computer 120 determines whether or not scan of all the pages is ended. When the scan of all the pages is not ended, the computer 120 proceeds to step S30. On the other hand, when the scan of all the pages is ended, the computer 120 proceeds to step S34. When all the double-page spread scan of the booklet 15 is ended, the user operates the input portion 101 to input information indicating that all the double-page spread scan of the booklet 15 is ended. When the information indicating the end of scan is received from the input portion 101, the computer 120 determines that scan of all the pages is ended and proceeds to step S34. When the information indicating the end of scan is not received from the input portion 101, the computer 120 determines that scan of all the pages is not ended and proceeds to step S30.

In step S30, the computer 120 executes the n-th double-page spread scan. That is, the user turns the pages of the booklet 15, sets the booklet 15 in the double-page spread state, and then instructs the computer 120 to perform reading by operating the input portion 101. When the reading instruction is received from the input portion 101, the computer 120 controls the image reading apparatus 11 to execute the n-th double-page spread scan.

In step S31, the computer 120 divides the main text page. That is, the computer 120 executes the same process as the process of step S20. In step S32, the computer 120 determines whether or not an image of the cover sheet/back cover sheet is present. As illustrated in FIGS. 11, 14, 15, and 18, after the cover sheet H1 and the back cover sheet H2 are specified in the second scan, the first image SD1 including the image of the cover sheet/back cover sheet is stored in the storage portion 61 in the third and subsequent scans. When the first image SD1 including the image of the cover sheet/back cover sheet is included in the image data D in the storage portion 61, the computer 120 determines that the image of the cover sheet/back cover sheet is present. On the other hand, as illustrated in FIG. 17, when it has a configuration in which the first image SD1 is discarded without being stored in the storage portion 61 for the third and subsequent scans, the computer 120 determines that the image of the cover sheet/back cover sheet is not present. When the image of the cover sheet/back cover sheet is present, the computer 120 proceeds to step S33. On the other hand, when the image of the cover sheet/back cover sheet is not present, the computer 120 returns to step S21.

In step S33, the computer 120 deletes the image of the cover sheet/back cover sheet. The cover sheet image data HD (for example, the first image SD1) including the cover sheets H1 and H2, which are read in the n-th scan after the third and subsequent scans as illustrated in FIGS. 11, 14, 15, and 18, are deleted from the storage portion 61. When the fact that the cover sheet image data HD including the cover sheets H1 and H2 becomes the second image SD2 as in the example of the second scan in FIG. 15 occurs in the n-th scan after the third and subsequent scans, the computer 120 deletes the second image SD2, which is the cover sheet image data HD, from the storage portion 61. The computer 120 returns to step S21 after the image of the cover sheet/back cover sheet is deleted.

By performing the processes of step S21 to step S26, pages are allocated to the main text image data CD read in the n-th double-page spread scan. By this allocation, the main text image data CD are rearranged in the allocation order in which the pages are allocated. For example, on the display portion 102, the preview screen 130 illustrated in FIG. 9, in which the main text image data CD are rearranged in the allocation order, is displayed by the display control portion 76.

Thereafter, the n-th double-page spread scan is sequentially performed until it is determined in step S29 that scan of all the pages is ended (step S30). Division of the main text pages (step S31), deletion of the cover sheet image data HD (step S33), allocation of the pages (steps S22 to S26), and removal of blank sheet pages (steps S27 and S28) are executed for each double-page spread scan. The display portion 102 also displays a preview screen 130 to which the main text image data CD are added in a state of being rearranged in page order from the preview screen 130 illustrated in FIG. 9.

When all the double-page spread scan of the booklet 15 is ended, the user operates the input portion 101 to input information indicating that all the double-page spread scan of the booklet 15 is ended. When the information indicating the end of scan is received from the input portion 101, in step S29, the computer 120 determines that scan of all the pages is ended and proceeds to step S34.

In step S34, the computer 120 saves the combined pages in one file. This process is performed by the file generation portion 88 and the transfer control portion 78. The file generation portion 88 of the computer 120 generates an image file in a saving format designated in advance by the user. The transfer control portion 78 of the computer 120 saves or transfers the image file to an address of the saving destination designated in advance by the user on the transfer destination selection screen 140.

As described above, the example in which the booklet reading process is executed by the reading control apparatus 110 has been described, and even when the computer 60 of the image reading apparatus 11 executes the booklet reading process, the basic processing contents are the same. In this case, the preview screen 130 may be displayed on the display portion 22 of the image reading apparatus 11, or the preview screen 130 may be displayed on the display portion 102 of the host apparatus 100.

As described above in detail, according to the present embodiment, the following effects can be obtained.

(1) The image reading system 10 includes the image reading apparatus 11 capable of performing a double sided reading by the reading portion 40, and the reading control apparatus 110 communicably connected to the image reading apparatus 11. The reading portion 40 includes the first reading portion 42A capable of reading a first side of the document D1, and the second reading portion 42B capable of reading a second side that is a side opposite to the first side of the document D1. The image reading system 10 includes the storage portion 61, the cover sheet determination portion 81, the main text determination portion 82, the arrangement processing portion 86, and the file generation portion 88. When the image reading apparatus 11 performs a double sided reading in a state in which the booklet 15, which has a pair of cover sheets 15A and 15B and the main texts 15D interposed between the pair of cover sheets 15A and 15B, is opened at least once, the storage portion 61 stores the image data of the booklet 15 read by the reading portion 40. The cover sheet determination portion 81 determines whether or not the image data, which is stored in the storage portion 61, is the cover sheet image data HD in which the cover sheets 15A and 15B are read. The main text determination portion 82 determines the image data of the back sides of the cover sheets, which are reading sources of the cover sheet image data determined by the cover sheet determination portion 81 among the image data stored in the storage portion 61, as the main text image data. The arrangement processing portion 86 rearranges the cover sheet image data HD and the main text image data CD at the page order arrangement positions of the booklet 15. The file generation portion 88 generates an image file from the cover sheet image data HD and the main text image data CD rearranged by the arrangement processing portion 86. The arrangement processing portion 86 divides the cover sheet image data HD into two parts corresponding to the pair of cover sheets 15A and 15B to arrange the two at the front and the end, respectively, and arranges the main text image data CD between the front and the end. According to this configuration, the booklet 15 can be read as it is without cutting or the like. Moreover, since the image file in which the images of the cover sheets 15A and 15B and the main texts 15D are arranged in the order of the booklet 15 is generated, it is possible to reduce the user's job of rearranging the images read from the booklet 15.

(2) The cover sheet determination portion 81 determines whether or not the image data is the cover sheet image data HD by comparing the image data read at the present time with the image data read before the previous time. When the cover sheet determination portion 81 cannot determine that the image data is the cover sheet image data, the cover sheet determination portion 81 rotates one of two image data, which are the image data that is read at the present time and the image data that is read before the previous time, by half a turn, and then compares the two image data. According to this configuration, the user can set the booklet 15 without worrying about the orientation of the booklet 15.

(3) The image reading system 10 includes the optical character recognition portion 83. The pair of cover sheets H1 and H2 are the cover sheet H1 and the back cover sheet H2. The cover sheet image data HD includes two areas, a cover sheet candidate and a back cover sheet candidate. The optical character recognition portion 83 acquires a page number PN of a back side of the cover sheet candidate and a page number PN of a back side of the back cover sheet candidate in the main text image data CD. The cover sheet determination portion 81 determines a candidate having a smaller value of the two page numbers PN that are on the back sides of the cover sheet candidate and the back cover sheet candidate as the cover sheet H1, and determines a candidate having a larger value as the back cover sheet H2. According to this configuration, the cover sheet H1 and the back cover sheet H2 can be automatically determined, which increases convenience. For example, it is possible to reduce or eliminate the operation in which the user manually designates at least one of the cover sheet and back cover sheet.

(4) In the image reading system 10, after the cover sheet determination portion 81 determined that the image data D is the cover sheet image data HD, when the image data D obtained by the next and subsequent readings is the same as the cover sheet image data HD, the image data D is not stored in the storage portion 61. According to this configuration, unnecessary image data is discarded, so that the efficiency of the storage portion 61 is improved.

(5) The image reading system 10 includes the input portions 21 and 101. It is configured such that a normal mode, in which the document D1 having a single sheet is read and an image file is generated, and a booklet generation mode, in which the booklet 15 is read and an image file including cover sheet image data HD and main text image data CD is generated, can be selected by the input portions 21 and 101. According to this configuration, it is possible to select a mode according to the intended use, so that convenience is improved. When the booklet generation mode is selected, the image file of the booklet 15 can be easily acquired.

(6) The image reading system 10 includes the division processing portion 85 that sets half the size of the cover sheet image data HD as the size of one page and divides the main text image data CD into half the size of the cover sheet image data HD (one page size). The arrangement processing portion 86 individually arranges the main text image data CD divided by the division processing portion 85. According to this configuration, since an image file is generated in which the cover sheet images H1 and H2 and the main text image CD are combined for each page, it becomes easy to see when the image file is displayed on the display portion 102 or the like, and the ease of page management is improved.

(7) The image reading system 10 further includes the page area detection portion 84 that detects the presence or absence of an image in the boundary part BA of the two page candidate areas included in the main text image data CD. When an image is not present in the boundary part BA, the arrangement processing portion 86 performs the arrangement process of dividing the main text image data CD into half the size of the cover sheet image data HD (the sizes of the cover sheet images H1 and H2) and individually arranging the divided main text image data CD. On the other hand, when an image is present in the boundary part BA, the arrangement processing portion 86 performs the arrangement process of arranging the main text image data CD without dividing the main text image data CD by the sizes of the cover sheets H1 and H2. According to this configuration, the readability of the double-spread pages of the booklet 15 is improved when the image file is displayed on the display portion 102 or the like.

(8) The image reading system 10 includes the optical character recognition portion. The arrangement processing portion 86 changes the vertical orientation of at least one of the cover sheet image data HD and the main text image data CD based on an orientation of the character information of the cover sheets H1 and H2 acquired by the optical character recognition portion 83 or an orientation of the character information of the main text CD. According to this configuration, it is possible to suppress an error in rearranging the orientations of the cover sheets H1 and H2 and the main text CD.

(9) After the cover sheet determination portion 81 determined that the image data D is the cover sheet image data HD, the image reading apparatus 11 is switched to a single sided reading for reading only a side of the main text of the booklet 15, and the cover sheet determination portion 81 does not perform the determination process. According to this configuration, since the image reading apparatus 11 is switched to the single sided reading after the cover sheet image data HD is acquired, the total amount of image data can be reduced. For example, at least one of the effects of improving the usage efficiency of the storage portion 61 and shortening the total required time from the start of reading to the generation of the image file can be obtained.

(10) The image reading apparatus 11 is configured to be capable of reading both sides of the document D1 simultaneously by the reading portion 40 including the first reading portion 42A capable of reading a first side of the document D1, and the second reading portion 42B capable of reading a second side that is a side opposite to the first side of the document D1. The image reading apparatus 11 includes the storage portion 61, the cover sheet determination portion 81, the main text determination portion 82, the arrangement processing portion 86, and the file generation portion 88. When the image reading apparatus 11 performs a double sided reading in a state in which the booklet 15, which has a pair of cover sheets 15A and 15B and the main texts 15D interposed between the pair of cover sheets 15A and 15B, is opened at least once, the storage portion 61 stores the image data of the booklet 15 read by the reading portion 40. The cover sheet determination portion 81 determines whether or not the image data, which is stored in the storage portion 61, is the cover sheet image data HD in which the cover sheets 15A and 15B are read. The main text determination portion 82 determines the image data of the back sides of the cover sheets, which are reading sources of the cover sheet image data HD determined by the cover sheet determination portion 81 among the image data stored in the storage portion 61, as the main text image data. The arrangement processing portion 86 rearranges the cover sheet image data HD and the main text image data CD at the page order arrangement positions of the booklet 15. The file generation portion 88 generates an image file from the cover sheet image data HD and the main text image data CD rearranged by the arrangement processing portion 86. The arrangement processing portion 86 divides the cover sheet image data HD into two parts corresponding to the pair of cover sheets 15A and 15B to arrange the two at the front and the end, respectively, and arranges the main text image data between the front and the end. According to this configuration, the booklet 15 can be read as it is without cutting or the like. Moreover, since the image file in which the images of the cover sheets 15A and 15B and the main texts 15D are arranged in the order of the booklet 15 is generated, it is possible to reduce the user's job of rearranging the images read from the booklet 15.

(11) In the image reading method, a file of the booklet 15 is generated from image data acquired by causing the image reading apparatus 11, which is capable of performing a double sided reading by the reading portion 40, to read the booklet 15. The reading portion 40 includes the first reading portion 42A capable of reading a first side of the document D1, and the second reading portion 42B capable of reading a second side that is a side opposite to the first side of the document D1. When the image reading apparatus 11 performs a double sided reading in a state in which the booklet 15, which has a pair of cover sheets 15A and 15B and the main texts 15D interposed between the pair of cover sheets 15A and 15B, is opened at least once, the image reading method includes the following (a) to (e). (a) The computer stores the image data of the booklet 15 read by the reading portion 40 in the storage portion 61. (b) The computer determines whether or not the image data, which is stored in the storage portion 61, is the cover sheet image data HD in which the cover sheets 15A and 15B are read. (c) The computer determines the image data of the back sides of the cover sheets, which are reading sources of the cover sheet image data determined in (b) among the image data stored in the storage portion 61, as the main text image data. (d) The computer rearranges the cover sheet image data HD and the main text image data CD at the page order arrangement positions of the booklet 15. (e) The computer generates an image file from the rearranged cover sheet image data HD and main text image data CD. Thereafter, in (d), the cover sheet image data HD is divided into two parts corresponding to the pair of cover sheets 15A and 15B, the two parts are arranged at the front and the end, respectively, and the main text image data CD is arranged between the front and the end. According to this image reading method, the booklet 15 can be read as it is without cutting or the like. Moreover, since the image file in which the images of the cover sheets 15A and 15B and the main texts 15D are arranged in the order of the booklet 15 is generated, it is possible to reduce the user's job of rearranging the images read from the booklet 15.

(12) The program PR is executed by the computer to perform a process of generating a file of the booklet 15 from the image data acquired by causing the image reading apparatus 11, which is capable of performing a double sided reading by the reading portion 40, to read the booklet 15. The reading portion 40 includes the first reading portion 42A capable of reading a first side of the document Dl, and the second reading portion 42B capable of reading a second side that is a side opposite to the first side of the document Dl. When the image reading apparatus 11 performs a double sided reading in a state in which the booklet 15, which has a pair of cover sheets 15A and 15B and the main texts 15D interposed between the pair of cover sheets 15A and 15B, is opened at least once, the program PR causes the computer to execute the following (a) to (e). (a) Storing the image data of the booklet 15 read by the reading portion 40 in the storage portion 61. (b) Determining whether or not the image data, which is stored in the storage portion 61, is the cover sheet image data HD in which the cover sheets 15A and 15B are read. (c) Determining the image data of the back sides of the cover sheets, which are reading sources of the cover sheet image data determined in (b) among the image data stored in the storage portion 61, as the main text image data. (d) Rearranging the cover sheet image data HD and the main text image data CD at the page order arrangement positions of the booklet 15. (e) Generating an image file from the rearranged cover sheet image data HD and main text image data CD. In (d), the cover sheet image data HD is divided into two parts corresponding to the pair of cover sheets 15A and 15B, the two parts are arranged at the front and the end, respectively, and the main text image data CD is arranged between the front and the end.

According to this program, the booklet 15 can be read as it is without cutting or the like. Moreover, since the image file in which the images of the cover sheets 15A and 15B and the main texts 15D are arranged in the order of the booklet 15 is generated, it is possible to reduce the user's job of rearranging the images read from the booklet 15.

Second Embodiment

Figure 22:
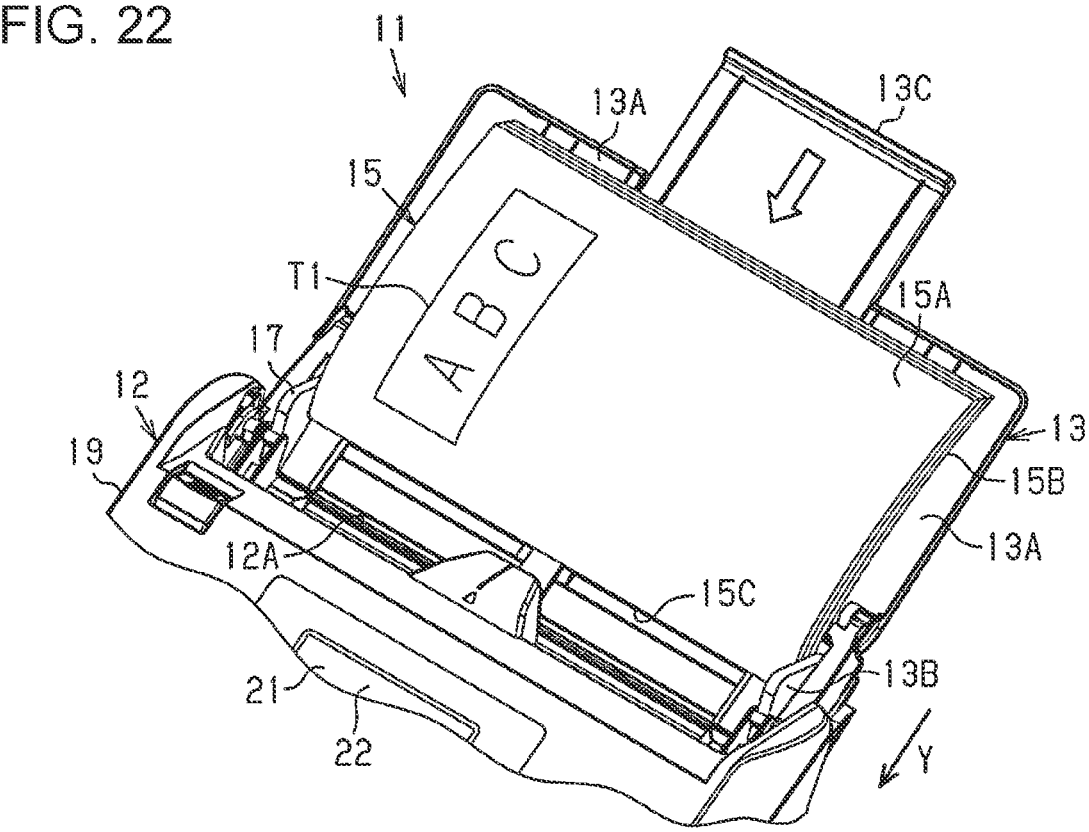
FIG. 22 is a partial perspective view illustrating a state in which the booklet is set in the image reading apparatus in a state in which the booklet is closed according to a second embodiment.

Next, a second embodiment will be described with reference to FIGS. 22 to 24. As illustrated in FIG. 22, the booklet 15 is set on the document support 13 in a closed state. The first scan is performed in a state in which the booklet 15 is closed. The orientation in which the booklet 15 is set is defined as an orientation in which a spine cover sheet 15C becomes a front side of the reading. Thereby, it is possible to suppress the occurrence of jamming in the booklet 15. The reading portion 40 performs the first reading in a state in which the booklet 15 is closed and performs the second and subsequent readings in a state in which the booklet 15 is opened.

Figure 23:
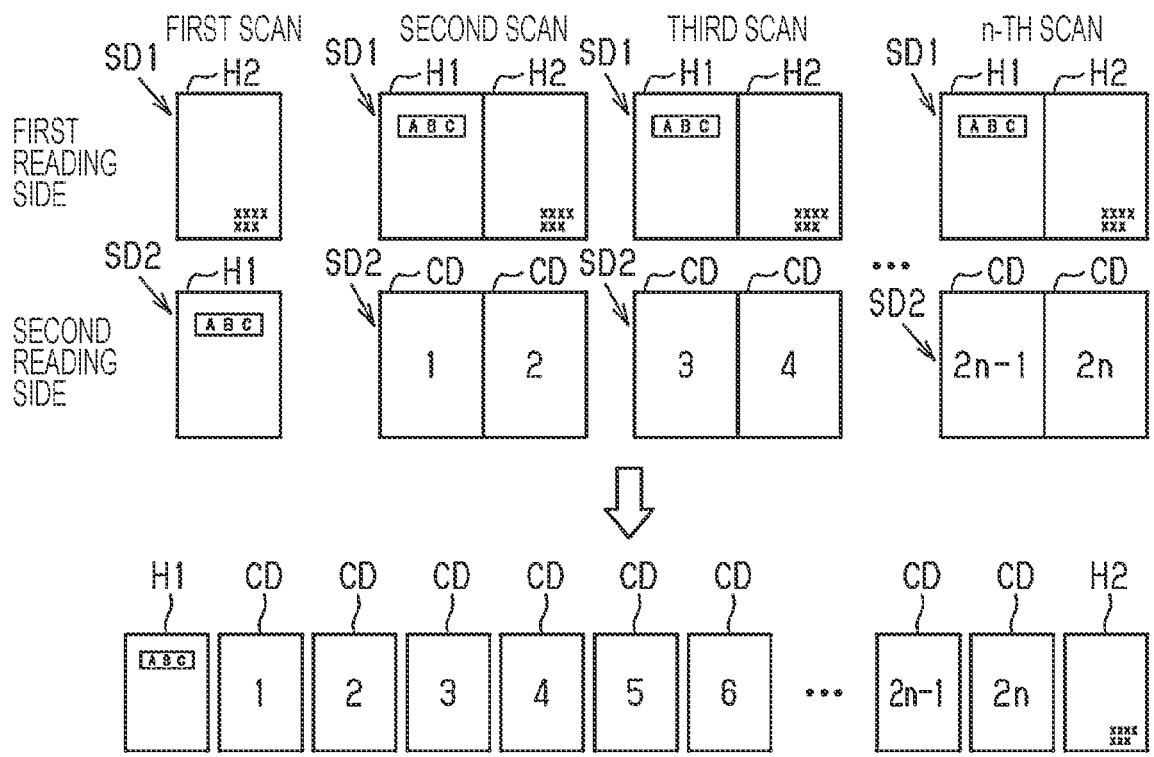
FIG. 23 is a schematic diagram describing scanned images and the rearrangement process.

As a result, as illustrated in FIG. 23, the first image SD1 and the second image SD2 are obtained in each scan. In the first scan, the cover sheet image H1 is obtained by reading only the cover sheet 15A as the first reading side, and the back cover sheet image H2 is obtained by reading only the back cover sheet 15B as the second reading side. The cover sheet determination portion 81 may determine the first image SD1 as the cover sheet image H1 and determine the second image SD2 as the back cover sheet image H2. The cover sheet determination portion 81 may determine the cover sheet image H1 and the back cover sheet image H2 by using the same method as in the first embodiment. For example, the cover sheet determination portion 81 may use the first image SD1 as the cover sheet candidate and the second image SD2 as the back cover sheet candidate. In this case, similarly to the first embodiment, the optical character recognition portion 83 acquires the page number PN of the back side of the cover sheet candidate and the page number PN of the back side of the back cover sheet candidate. The cover sheet determination portion 81 may compare the magnitudes of the values of both sides of the page numbers PN, determine a candidate having a smaller value of the two page numbers of the cover sheet candidate and the back cover sheet candidate as the cover sheet image H1, and determine a candidate having a larger value as the back cover sheet image H2.

In the first reading, the cover sheet determination portion 81 determines the first cover sheet image data H1 obtained by reading the cover sheet 15A and the second cover sheet image data H2 obtained by reading the back cover sheet 15B.

In the second and subsequent readings, the main text determination portion 82 determines the image data corresponding to the back side of the cover sheet 15A and the image data corresponding to the back side of the back cover sheet 15B, as the main text image data CD. The image data corresponding to the back side of the cover sheet 15A is specified by specifying the cover sheet 15A based on the first cover sheet image data H1. The image data corresponding to the back side of the back cover sheet 15B is specified by specifying the back cover sheet 15B based on the second cover sheet image data H2.

The arrangement processing portion performs the arrangement process of rearranging the image data D after the division process by the division processing portion 85. As a result of this arrangement process, as illustrated on the lower side in FIG. 23, the cover sheet H1 is arranged at the front and the back cover sheet H2 is arranged at the end, and the main texts CD are rearranged in page order between the cover sheet H1 and the back cover sheet H2. The file generation portion 88 generates an image file in which the image data D after the arrangement process are combined into one.

Figure 24:
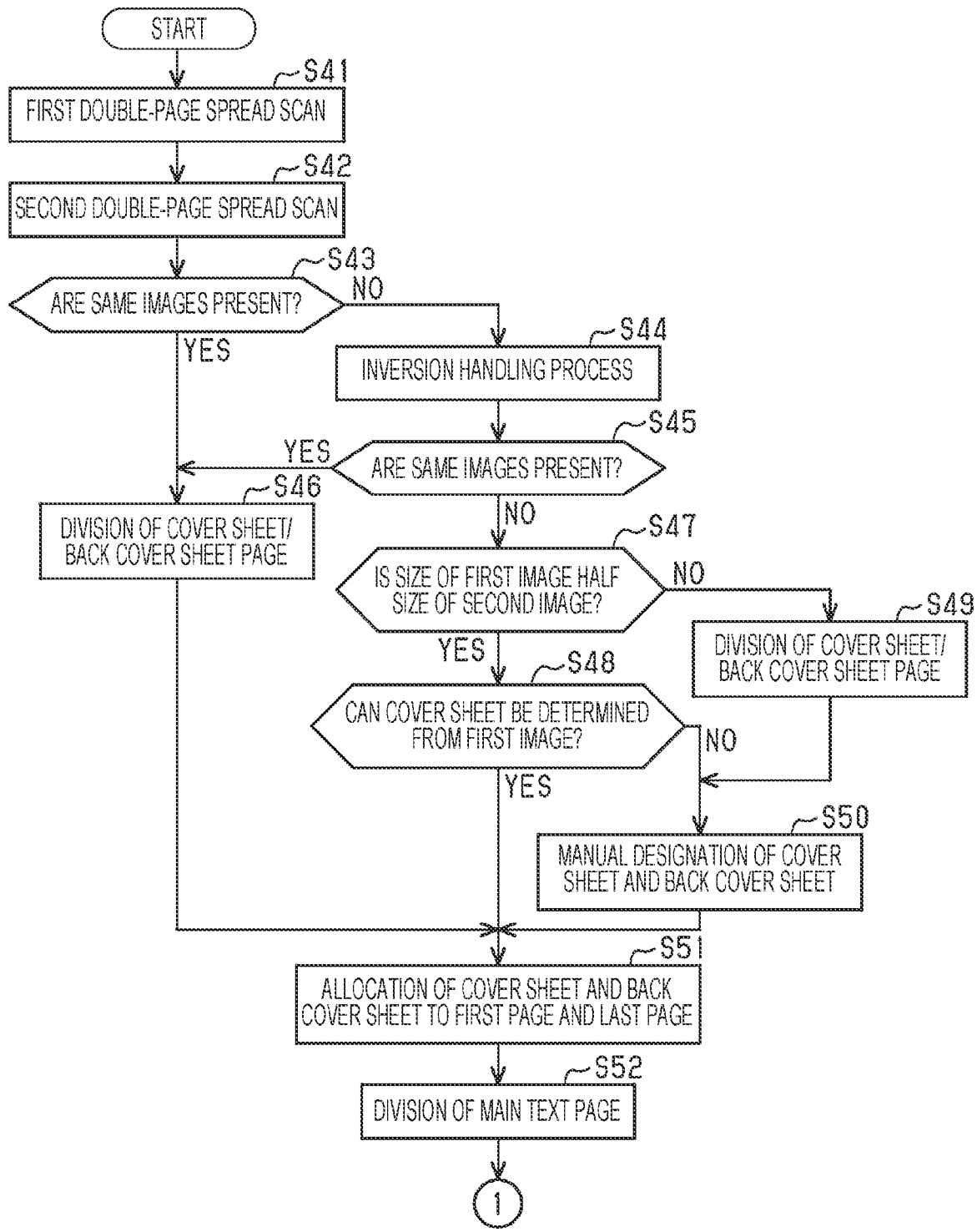
FIG. 24 is a flowchart illustrating the booklet reading process routine.

The storage portion 61 stores the program PR in which a part of the booklet reading process routine is replaced with the processing content illustrated in FIG. 24. Hereinafter, the booklet reading process routine executed by the computer 120 will be described. Even when the execution is performed by the computer 60 of the image reading apparatus 11, the processing content is basically the same.

As illustrated in FIG. 22, the user sets the booklet 15 by inserting the booklet 15 into the document support 13 in a direction of a void arrow in a closed state. Hereinafter, the booklet reading process routine according to the second embodiment will be described with reference to FIG. 24.

Figure 20:
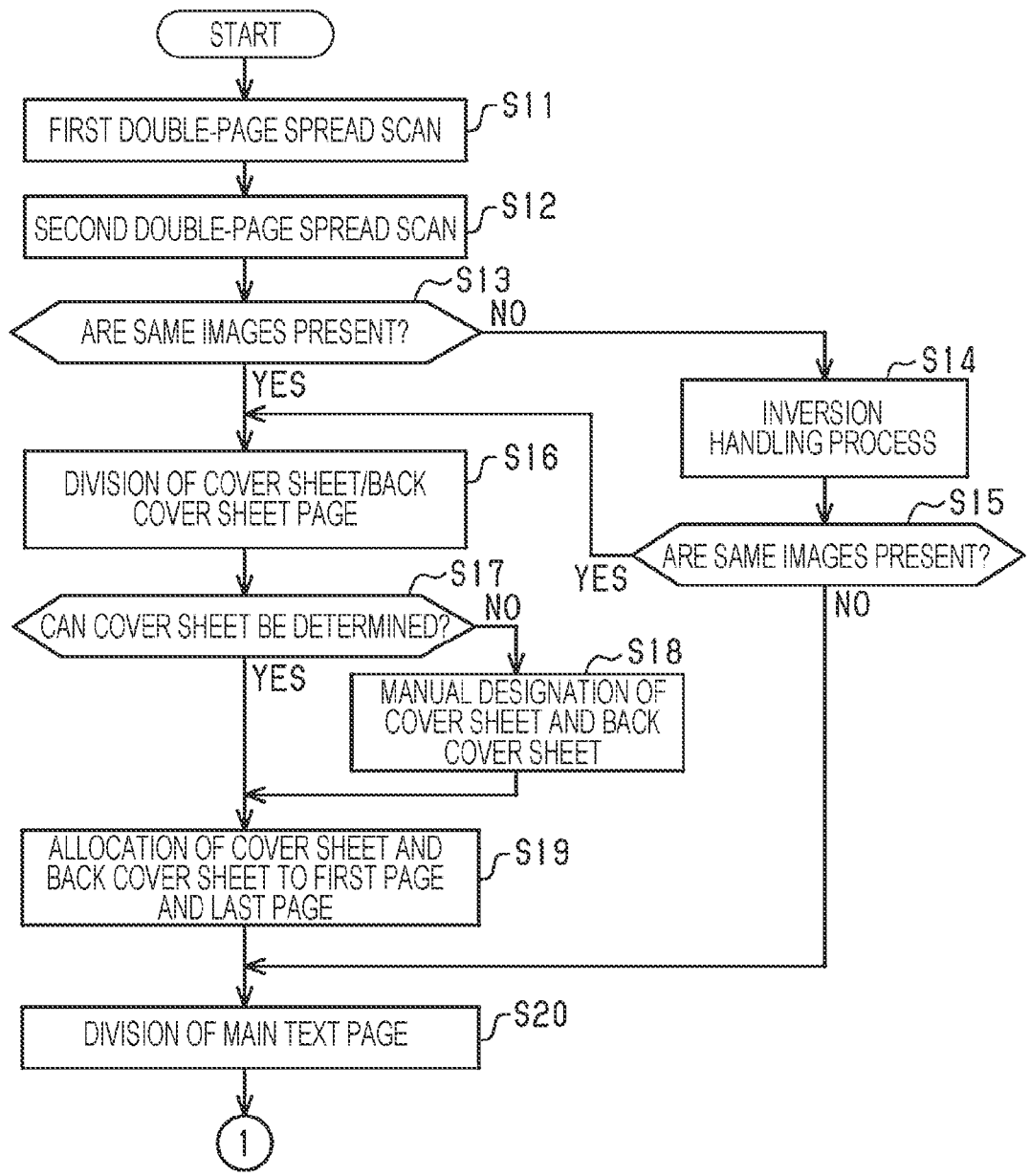
FIG. 20 is a flowchart illustrating processing of the first half of a booklet reading process routine.

The processes of step S41 to step S46 are the same as the processes of step S11 to step S16 in FIG. 20 of the first embodiment. First, in step S41, the computer 120 executes the first double-page spread scan.

In step S42, the computer 120 executes the second double-page spread scan. In step S43, the computer 120 determines whether or not the same images are present. The computer 120 proceeds to step S44 when the same images are not present, and proceeds to step S46 when the same images are present.

In step S44, the computer 120 executes the inversion handling process. In step S45, the computer 120 determines whether or not the same images are present. The computer 120 proceeds to step S46 when the same images are present and proceeds to step S47 when the same images are not present.

In step S46, the computer 120 performs division of the cover sheet/back cover sheet page. Step S46 is the same as the process of step S16 in the first embodiment. In step S47, the computer 120 determines whether or not the size of the first image is half the size of the second image. When the size of the first image is half the size of the second image, the computer 120 proceeds to step S48. On the other hand, when the size of the first image is not half the size of the second image, the computer 120 proceeds to step S49.

In step S48, the computer 120 determines whether or not the cover sheet can be determined from the first image. This process is the same as the process of step S17 in the first embodiment.

In step S49, the computer 120 performs division of the cover sheet/back cover sheet page. This process is the same as the process of step S16 in the first embodiment. That is, the same process as in step S46 is performed.

In step S50, the computer 120 manually designates the cover sheet and the back cover sheet. This process is the same as the process of step S18 in the first embodiment. In step S51, the computer 120 allocates the cover sheet and back cover sheet to the first page and the last page. This process is the same as the process of step S19 in the first embodiment.

In step S52, the computer 120 divides the main text page. This process is the same as the process of step S20 in the first embodiment. The subsequent processes after step S52 are the same as the processes of step S21 to step S34 illustrated in FIG. 21 in the first embodiment.

According to the second embodiment, in addition to the effects (1) to (12) of the first embodiment, the following effects are also obtained.

(13) The pair of cover sheets are the cover sheet 15A and the back cover sheet 15B. The reading portion 40 performs the first reading in a state in which the booklet 15 is closed and performs the second and subsequent readings in a state in which the booklet 15 is opened. In the first reading, the cover sheet determination portion 81 determines the first cover sheet image data H1 obtained by reading the cover sheet 15A and the second cover sheet image data H2 obtained by reading the back cover sheet 15B. In the second and subsequent readings, the main text determination portion 82 determines the image data, which corresponds to the back side of the image data of the cover sheet 15A specified based on the first cover sheet image data H1, and the image data, which corresponds to the back side of the image data of the back cover sheet 15B specified based on the second cover sheet image data H2, as the main text image data CD. According to this configuration, since only the cover sheet 15A and the back cover sheet 15B are read in the first reading, it is easy to determine the cover sheet image H1 and the back cover sheet image H2.

The above-described embodiment can be changed to a form like the modification examples shown below. In addition, further modification examples can be made by appropriately combining the above-described embodiments and modification examples shown below, and an appropriate combination of the modification examples shown below can also be used as the further modification examples.

When a shadow is generated on the boundary part BA of two page candidate areas having the same size as the cover sheet included in the main text image data, the shadow may be determined as an image. In this case, the main text image data CD whose size is double the size of the cover sheet is determined to be one page including the image. When the image, which is determined to be in the boundary part BA, is an image whose density decreases as it moves away from the boundary between the two page candidate areas, the process may be performed to divide the main text image data by considering the image as a shadow. It may be determined whether or not the image is a shadow based on the histogram data of the boundary part BA. By using one of above methods, it is possible to suppress the inconvenience that the main text image data CD including two pages is not properly divided due to the fact that the shadow generated in the boundary part BA is determined to be the image.

When the cover sheet determination portion 81 determines the cover sheet and the booklet 15 is set in the opposite way, the computers 60 and 120 may issue a warning by displaying the fact on the display portions 22 and 102.

All the pages of the booklet 15 are read and stored in the storage portion 61, and then the first images SD1, in which the cover sheets 15A and 15B are read, may be deleted except for the cover sheets H1 and H2.

The cover sheet determination portion 81 may determine the cover sheet H1 and the back cover sheet H2, may determine only the cover sheet H1, or may determine only the back cover sheet H2.

In each of the above embodiments, the preview screens 130 are displayed on the display portions 22 and 102 of both the image reading apparatus 11 and the host apparatus 100, but the preview screen 130 may be displayed on only one of the display portions 22 and 102. For example, the preview screen 130 may be displayed only on the display portion 102 of the host apparatus 100 by the reading control apparatus 110.

The power source of the transport portion 31 and the ejection portion 32 is not limited to being common, the transport portion 31 and the ejection portion 32 may be driven by separate power sources. For example, the power source of the transport portion 31 is set as a transporting motor, and the power source of the ejection portion 32 is set as an ejection motor.

The image sensor is not limited to the linear image sensor, and an area image sensor may be used.

The image sensor may be, for example, a metal oxide semiconductor (MOS) image sensor.

Each functional portion in the computer 60 is not limited to being implemented by software using a CPU and hardware using an ASIC. Each functional portion may be implemented by hardware with an electronic circuit such as a field-programmable gate array (FPGA) or may be implemented by either software or hardware.

The image reading apparatus may be a part of a multi-function machine having a printing function and a copying function in addition to a scanner function.

The image reading apparatus is not limited to a sheet feed type, and a flatbed type may be used. In the case of a flatbed type image reading apparatus, a carriage that is capable of being moved along a sub-scanning direction Y is provided in the main body, the carriage is moved by using a scanning motor as a power source, and an image of a document, which is set on a glass plate on a document stand, is read by a light source and a reading portion provided in the carriage. This type of flatbed type image reading apparatus may include an automatic document feeding apparatus (an auto sheet feeder) that automatically feeds documents. Further, the image reading control method and the program in the image reading apparatus can be applied not only to the image reading apparatus but also to the flatbed type image reading apparatus.

Hereinafter, the technical idea grasped from the above-mentioned embodiments and the modification examples will be described together with the effect.

(A) Provided is an image reading system that includes an image reading apparatus, which is configured to perform a double sided reading by a reading portion including a first reading portion configured to read a first side of a document and a second reading portion configured to read a second side that is a side opposite to the first side of the document, and a reading control apparatus communicably connected to the image reading apparatus, the image reading system includes: a storage portion storing, when the image reading apparatus performs the double sided reading in a state in which a booklet having a pair of cover sheets and a main text interposed between the pair of cover sheets is opened at least one time, image data of the booklet read by the reading portion; a cover sheet determination portion determining whether the image data, which is stored in the storage portion, is cover sheet image data obtained by reading the cover sheet; a main text determination portion determining image data of a back side of the cover sheet, which is a reading source of the cover sheet image data determined by the cover sheet determination portion among the image data stored in the storage portion, as main text image data; an arrangement processing portion rearranging the cover sheet image data and the main text image data at page order arrangement positions of the booklet; and a file generation portion generating an image file from the cover sheet image data and the main text image data rearranged by the arrangement processing portion, in which the arrangement processing portion divides the cover sheet image data into two parts corresponding to the pair of cover sheets to arrange the two parts at a front and an end, respectively, and arranges the main text image data between the front and the end.

According to this configuration, the booklet can be read as it is without cutting or the like, and since a file is generated in which the images of the cover sheets and the main texts are arranged in the order of the booklet, it is possible to reduce the user's job of rearranging the images read from the booklet.

(B) In the image reading system, the cover sheet determination portion may compare the image data, which is read at present time, with image data, which is read before previous time, to determine whether the image data is the cover sheet image data, and when a determination is made that the image data is not the cover sheet image data, the cover sheet determination portion may rotate one of two image data, which are the image data read at the present time and the image data read before the previous time, by half a turn, and then compare the two image data.

According to this configuration, the user can set the booklet without worrying about the orientation of the booklet.

(C) The image reading system may further include an optical character recognition portion, in which the pair of cover sheets may be a cover sheet and a back cover sheet, the cover sheet image data may include two areas of a cover sheet candidate and a back cover sheet candidate, the optical character recognition portion may acquire a page number of a back side of the cover sheet candidate and a page number of a back side of the back cover sheet candidate in the main text image data, and the cover sheet determination portion may determine a candidate having a smaller value of the two page numbers on the back sides of the cover sheet candidate and the back cover sheet candidate as the cover sheet, and determine a candidate having a larger value of the two page numbers on the back sides of the cover sheet candidate and the back cover sheet candidate as the back cover sheet.

According to this configuration, the cover sheet and the back cover sheet can be automatically determined, which increases convenience. For example, it is possible to reduce or eliminate the operation in which the user manually designates at least one of the cover sheet and back cover sheet.

(D) In the image reading system after the cover sheet determination portion determines that the image data is the cover sheet image data, when there is image data that is the same as the cover sheet image data in next and subsequent readings, the image data may be not stored in the storage portion.

According to this configuration, unnecessary image data is discarded, so that the efficiency of the storage portion is improved.

(E) The image reading system may further include an input portion, in which a normal mode, in which an image file is generated by reading the document having a single sheet, and a booklet generation mode, in which the image file including the cover sheet image data and the main text image data is generated by reading the booklet, may be configured to be selectable by the input portion.

According to this configuration, it is possible to select a mode according to the intended use, so that convenience is improved. For example, when the booklet generation mode is selected, the image file of the booklet can be easily acquired.

(F) The image reading system may further include a division processing portion defining a half size of the cover sheet image data as a size of one page and dividing the main text image data by the size, in which the arrangement processing portion may individually arrange the main text image data divided by the division processing portion.

According to this configuration, since a file is generated in which the cover sheet images and the main text image are combined for each page, it becomes easy to see when the image file is displayed on the display portion or the like, and the ease of page management is improved.

(G) The image reading system may further include a page area detection portion detecting a presence or absence of an image in a boundary part between two page candidate areas included in the main text image data, in which the arrangement processing portion may divide the main text image data by the size to individually arrange the divided main text image data when the image is not present in the boundary part, and may arrange the main text image data without dividing the main text image data by the size when the image is present in the boundary part.

According to this configuration, the readability of the double-spread pages of the booklet is improved when the image file is displayed on the display portion or the like.

(H) The image reading system may further include an optical character recognition portion, in which the arrangement processing portion may change a vertical orientation of at least one of the cover sheet image data and the main text image data based on an orientation of character information of the cover sheet acquired by the optical character recognition portion or an orientation of character information of the main text acquired by the optical character recognition portion.

According to this configuration, it is possible to suppress an error in rearranging the orientations of the cover sheets and the main text.

(I) In the image reading system, after the cover sheet determination portion determines that the image data is the cover sheet image data, the image reading apparatus may be switched to a single sided reading for reading only a side of the main text of the booklet, and the cover sheet determination portion may not perform a determination process.

According to this configuration, since the image reading apparatus is switched to the single sided reading after the cover sheet image data is acquired, the total amount of image data can be reduced. For example, at least one of the effects of improving the usage efficiency of the storage portion and shortening the total required time from the start of reading to the generation of the image file can be obtained.

(J) In the image reading system, the pair of cover sheets may be a cover sheet and a back cover sheet, the reading portion may perform a first reading in a state in which the booklet is closed and perform second and subsequent readings in a state in which the booklet is opened, the cover sheet determination portion may determine first cover sheet image data obtained by reading the cover sheet and second cover sheet image data obtained by reading the back cover sheet by using a determination, in the first reading, and the main text determination portion may determine image data, which corresponds to a back side of image data of the cover sheet specified based on the first cover sheet image data, and image data, which corresponds to a back side of image data of the back cover sheet specified based on the second cover sheet image data, as the main text image data, in the second and subsequent readings.

According to this configuration, since only the cover sheet and the back cover sheet are read in the first reading, it is easy to determine the cover sheet image data and the back cover sheet image data.

(K) Provided is an image reading apparatus that is configured to perform a double sided reading by a reading portion including a first reading portion configured to read a first side of a document and a second reading portion configured to read a second side that is a side opposite to the first side of the document, the image reading apparatus includes: when the double sided reading is performed in a state in which a booklet having a pair of cover sheets and a main text interposed between the pair of cover sheets is opened at least one time, a storage portion storing image data of the booklet read by the reading portion; a cover sheet determination portion determining whether the image data, which is stored in the storage portion, is cover sheet image data obtained by reading the cover sheet; a main text determination portion determining image data of a back side of the cover sheet, which is a reading source of the cover sheet image data determined by the cover sheet determination portion among the image data stored in the storage portion, as main text image data; an arrangement processing portion rearranging the cover sheet image data and the main text image data at page order arrangement positions of the booklet; and a file generation portion generating an image file from the cover sheet image data and the main text image data rearranged by the arrangement processing portion, in which the arrangement processing portion divides the cover sheet image data into two parts corresponding to the pair of cover sheets to arrange the two parts at a front and an end, respectively, and arranges the main text image data between the front and the end.

According to this configuration, the booklet can be read as it is without cutting or the like, and since a file is generated in which the images of the cover sheets and the main texts are arranged in the order of the booklet, it is possible to reduce the user's job of rearranging the images read from the booklet.

(L) Provided is an image reading method of generating a file of a booklet from image data acquired by causing an image reading apparatus, which is configured to perform a double sided reading by a reading portion including a first reading portion configured to read a first side of a document and a second reading portion configured to read a second side that is a side opposite to the first side of the document, to read the booklet, the image reading method includes: when the image reading apparatus performs the double sided reading in a state in which a booklet having a pair of cover sheets and a main text interposed between the pair of cover sheets is opened at least one time, (a) storing, by a computer, image data of the booklet read by the reading portion in the storage portion; (b) determining, by the computer, whether the image data, which is stored in the storage portion, is cover sheet image data obtained by reading the cover sheet; (c) determining, by the computer, image data of a back side of the cover sheet, which is a reading source of the cover sheet image data determined in (b) among the image data stored in the storage portion, as main text image data; (d) rearranging, by the computer, the cover sheet image data and the main text image data at page order arrangement positions of the booklet; and (e) generating, by the computer, an image file from the cover sheet image data and the main text image data which are rearranged, in which in (d), the cover sheet image data is divided into two parts corresponding to the pair of cover sheets, the two parts are arranged at a front and an end, respectively, and the main text image data is arranged between the front and the end.

According to the image reading method, the booklet can be read as it is without cutting or the like, and since a file is generated in which the images of the cover sheets and the main texts are arranged in the order of the booklet, it is possible to reduce the user's job of rearranging the images read from the booklet.

(M) Provided is a non-transitory computer-readable storage medium storing a program executed by a computer to perform processing of generating a file of a booklet from image data acquired by causing an image reading apparatus, which is configured to perform a double sided reading by a reading portion including a first reading portion configured to read a first side of a document and a second reading portion configured to read a second side that is a side opposite to the first side of the document, to read the booklet, the program causing the computer to: when the image reading apparatus performs the double sided reading in a state in which a booklet having a pair of cover sheets and a main text interposed between the pair of cover sheets is opened at least one time, (a) store image data of the booklet read by the reading portion in the storage portion; (b) determine whether the image data, which is stored in the storage portion, is cover sheet image data obtained by reading the cover sheet; (c) determine image data of a back side of the cover sheet, which is a reading source of the cover sheet image data determined in (b) among the image data stored in the storage portion, as main text image data; (d) rearrange the cover sheet image data and the main text image data at page order arrangement positions of the booklet; and (e) generate a file from the cover sheet image data and the main text image data which are rearranged, in which in (d), the cover sheet image data is divided into two parts corresponding to the pair of cover sheets, the two parts are arranged at a front and an end, respectively, and the main text image data is arranged between the front and the end.

According to this program, the booklet can be read as it is without cutting or the like, and since a file is generated in which the images of the cover sheets and the main texts are arranged in the order of the booklet, it is possible to reduce the user's job of rearranging the images read from the booklet.

What is claimed is:

1. An image reading system that includes an image reading apparatus, which is configured to perform a double sided reading by a reading portion including a first reading portion configured to read a first side of a document and a second reading portion configured to read a second side that is a side opposite to the first side of the document, and a reading control apparatus communicably connected to the image reading apparatus, the image reading system comprising:
    a processor;
    a non-transitory storage portion storing, when the image reading apparatus performs the double sided reading in a state in which a booklet having a pair of cover sheets and a main text interposed between the pair of cover sheets is opened at least one time, image data of the booklet read by the reading portion, the storage portion also storing executable instructions that, when executed by the processor, cause the processor to instantiate;
    a cover sheet determination portion determining whether the image data, which is stored in the storage portion, is cover sheet image data obtained by reading the cover sheet;
    a main text determination portion determining image data of a back side of the cover sheet, which is a reading source of the cover sheet image data determined by the cover sheet determination portion among the image data stored in the storage portion, as main text image data;
    an arrangement processing portion rearranging the cover sheet image data and the main text image data at page order arrangement positions of the booklet; and
    a file generation portion generating an image file from the cover sheet image data and the main text image data rearranged by the arrangement processing portion, wherein
    the arrangement processing portion divides the cover sheet image data into two parts corresponding to the pair of cover sheets to arrange the two parts at a front and an end, respectively, and arranges the main text image data between the front and the end.

2. The image reading system according to claim 1, wherein
    the cover sheet determination portion compares the image data, which is read at present time, with image data, which is read before previous time, to determine whether the image data is the cover sheet image data, and when a determination is made that the image data is not the cover sheet image data, the cover sheet determination portion rotates one of two image data, which are the image data read at the present time and the image data read before the previous time, by half a turn, and then compares the two image data.

3. The image reading system according to claim 1, further comprising:
    the processor instantiating an optical character recognition portion, wherein
    the pair of cover sheets are a cover sheet and a back cover sheet,
    the cover sheet image data includes two areas of a cover sheet candidate and a back cover sheet candidate,
    the optical character recognition portion acquires a page number of a back side of the cover sheet candidate and a page number of a back side of the back cover sheet candidate in the main text image data, and
    the cover sheet determination portion determines a candidate having a smaller value of the two page numbers on the back sides of the cover sheet candidate and the back cover sheet candidate as the cover sheet, and determines a candidate having a larger value of the two page numbers on the back sides of the cover sheet candidate and the back cover sheet candidate as the back cover sheet.

4. The image reading system according to claim 1, wherein
    after the cover sheet determination portion determines that the image data is the cover sheet image data, when there is image data that is the same as the cover sheet image data in next and subsequent readings, the image data is not stored in the storage portion.

5. The image reading system according to claim 1, further comprising:
    an input portion, wherein
    a normal mode, in which an image file is generated by reading the document having a single sheet, and a booklet generation mode, in which the image file including the cover sheet image data and the main text image data is generated by reading the booklet, are configured to be selectable by the input portion.

6. The image reading system according to claim 1, further comprising:
    the processor instantiating a division processing portion defining a half size of the cover sheet image data as a size of one page and dividing the main text image data by the size, wherein
    the arrangement processing portion individually arranges the main text image data divided by the division processing portion.

7. The image reading system according to claim 6, further comprising:
    the processor instantiating a page area detection portion detecting a presence or absence of an image in a boundary part between two page candidate areas included in the main text image data, wherein
    the arrangement processing portion divides the main text image data by the size to individually arrange the divided main text image data when the image is not present in the boundary part, and arranges the main text image data without dividing the main text image data by the size when the image is present in the boundary part.

8. The image reading system according to claim 1, further comprising:
the processor instantiating an optical character recognition portion, wherein
the arrangement processing portion changes a vertical orientation of at least one of the cover sheet image data and the main text image data based on an orientation of character information of the cover sheet acquired by the optical character recognition portion or an orientation of character information of the main text acquired by the optical character recognition portion.

9. The image reading system according to claim 1, wherein
after the cover sheet determination portion determines that the image data is the cover sheet image data, the image reading apparatus is switched to a single sided reading for reading only a side of the main text of the booklet, and the cover sheet determination portion does not perform a determination process.

10. The image reading system according to claim 1, wherein
the pair of cover sheets are a cover sheet and a back cover sheet,
the reading portion performs a first reading in a state in which the booklet is closed and performs second and subsequent readings in a state in which the booklet is opened,
the cover sheet determination portion determines first cover sheet image data obtained by reading the cover sheet and second cover sheet image data obtained by reading the back cover sheet by using a determination, in the first reading, and
the main text determination portion determines image data, which corresponds to a back side of image data of the cover sheet specified based on the first cover sheet image data, and image data, which corresponds to a back side of image data of the back cover sheet specified based on the second cover sheet image data, as the main text image data, in the second and subsequent readings.

11. An image reading method of generating a file of a booklet from image data acquired by causing an image reading apparatus, which is configured to perform a double sided reading by a reading portion including a first reading portion configured to read a first side of a document and a second reading portion configured to read a second side that is a side opposite to the first side of the document, to read the booklet,
when the image reading apparatus performs the double sided reading in a state in which a booklet having a pair of cover sheets and a main text interposed between the pair of cover sheets is opened at least one time, the image reading method comprising:
(a) storing, by a computer, image data of the booklet read by the reading portion in the storage portion;
(b) determining, by the computer, whether the image data, which is stored in the storage portion, is cover sheet image data obtained by reading the cover sheet;
(c) determining, by the computer, image data of a back side of the cover sheet, which is a reading source of the cover sheet image data determined in (b) among the image data stored in the storage portion, as main text image data;
(d) rearranging, by the computer, the cover sheet image data and the main text image data at page order arrangement positions of the booklet; and
(e) generating, by the computer, an image file from the cover sheet image data and the main text image data which are rearranged, wherein in (d), the cover sheet image data is divided into two parts corresponding to the pair of cover sheets, the two parts are arranged at a front and an end, respectively, and the main text image data is arranged between the front and the end.

12. A non-transitory computer-readable storage medium storing a program executed by a computer to perform processing of generating a file of a booklet from image data acquired by causing an image reading apparatus, which is configured to perform a double sided reading by a reading portion including a first reading portion configured to read a first side of a document and a second reading portion configured to read a second side that is a side opposite to the first side of the document, to read the booklet,
when the image reading apparatus performs the double sided reading in a state in which a booklet having a pair of cover sheets and a main text interposed between the pair of cover sheets is opened at least one time, the executed program causing the computer to:
(a) store image data of the booklet read by the reading portion in the storage portion;
(b) determine whether the image data, which is stored in the storage portion, is cover sheet image data obtained by reading the cover sheet;
(c) determine image data of a back side of the cover sheet, which is a reading source of the cover sheet image data determined in (b) among the image data stored in the storage portion, as main text image data;
(d) rearrange the cover sheet image data and the main text image data at page order arrangement positions of the booklet; and
(e) generate a file from the cover sheet image data and the main text image data which are rearranged, wherein
in (d), the cover sheet image data is divided into two parts corresponding to the pair of cover sheets, the two parts are arranged at a front and an end, respectively, and the main text image data is arranged between the front and the end.

* * * * *